(12) United States Patent
Yamamoto et al.

(10) Patent No.: US 11,494,896 B2
(45) Date of Patent: Nov. 8, 2022

(54) COLLATION DEVICE

(71) Applicant: FUJIFILM Business Innovation Corp., Tokyo (JP)

(72) Inventors: Shigeru Yamamoto, Kanagawa (JP); Kazuhiro Hirata, Kanagawa (JP); Nobuhiro Kitagawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 23 days.

(21) Appl. No.: 17/329,173

(22) Filed: May 25, 2021

(65) Prior Publication Data

US 2022/0198631 A1 Jun. 23, 2022

(30) Foreign Application Priority Data

Dec. 22, 2020 (JP) .............................. JP2020-212626

(51) Int. Cl.
| | | |
|---|---|---|
| *G06T 7/00* | (2017.01) | |
| *G06K 9/62* | (2022.01) | |
| *G06V 10/141* | (2022.01) | |
| *H04N 5/225* | (2006.01) | |

(52) U.S. Cl.
CPC ............ *G06T 7/001* (2013.01); *G06K 9/6215* (2013.01); *G06V 10/141* (2022.01); *H04N 5/2256* (2013.01)

(58) Field of Classification Search
None
See application file for complete search history.

(56) References Cited

U.S. PATENT DOCUMENTS

| | | | | |
|---|---|---|---|---|
| 7,049,585 B2 * | 5/2006 | Nakasuji | ............... | H01J 37/222 250/306 |
| 7,095,022 B2 * | 8/2006 | Nakasuji | ............... | G01N 23/225 250/310 |
| 7,109,484 B2 * | 9/2006 | Nakasuji | ............... | H01J 37/185 250/307 |

(Continued)

FOREIGN PATENT DOCUMENTS

| | | |
|---|---|---|
| JP | H0576515 | 10/1993 |
| JP | 2004171109 | 6/2004 |

(Continued)

*Primary Examiner* — Reza Aghevli
(74) *Attorney, Agent, or Firm* — JCIPRNET

(57) ABSTRACT

A collation device includes a processor configured to: acquire plural captured images obtained by capturing an inspection image to be collated, while changing an irradiation direction of light to be emitted; and provide a notification of a collation result between the inspection image included in each of the captured images, and a collation image of which pattern changes depending on the irradiation direction of the light, according to a similarity between plural registered images obtained by capturing in advance the collation image while changing the irradiation direction of the light to be emitted to the collation image, and the inspection image, after adjusting a positional relationship between a camera, a light source, and an image to be identical to a positional relationship between a camera that captures the inspection image at a time of capturing the inspection image, a light source that irradiates the inspection image with light, and the inspection image.

20 Claims, 25 Drawing Sheets

(56) References Cited

U.S. PATENT DOCUMENTS

| | | | | |
|---|---|---|---|---|
| 7,241,993 B2 * | 7/2007 | Nakasuji | .............. | G01N 23/225 324/757.01 |
| 7,411,191 B2 * | 8/2008 | Nakasuji | ................. | H01J 29/70 250/307 |
| 7,417,236 B2 * | 8/2008 | Nakasuji | ................. | H01J 37/28 250/492.2 |
| 7,829,871 B2 * | 11/2010 | Nakasuji | ................. | H01J 37/06 250/370.15 |
| 2002/0028399 A1 * | 3/2002 | Nakasuji | ............. | H01L 21/6719 430/30 |
| 2002/0036264 A1 * | 3/2002 | Nakasuji | ............... | H01J 37/185 250/306 |
| 2005/0092921 A1 * | 5/2005 | Nakasuji | ................. | H01J 37/06 250/306 |
| 2006/0138343 A1 * | 6/2006 | Nakasuji | ............... | H01J 37/073 250/440.11 |
| 2007/0235644 A1 * | 10/2007 | Nakasuji | ............... | H01J 37/222 250/307 |
| 2008/0302963 A1 * | 12/2008 | Nakasuji | ............... | H01J 37/185 250/310 |
| 2011/0305388 A1 * | 12/2011 | Wedi | ........................ | G06T 5/50 382/165 |
| 2016/0300107 A1 * | 10/2016 | Callegari | ............. | G06V 10/751 |
| 2017/0118384 A1 * | 4/2017 | Chen | ........................ | F21V 19/02 |

FOREIGN PATENT DOCUMENTS

| | | | | |
|---|---|---|---|---|
| JP | | 2020154946 | 9/2020 | |
| WO | WO-2017119250 A1 * | | 7/2017 | ......... G01N 21/8806 |

* cited by examiner

200 μm

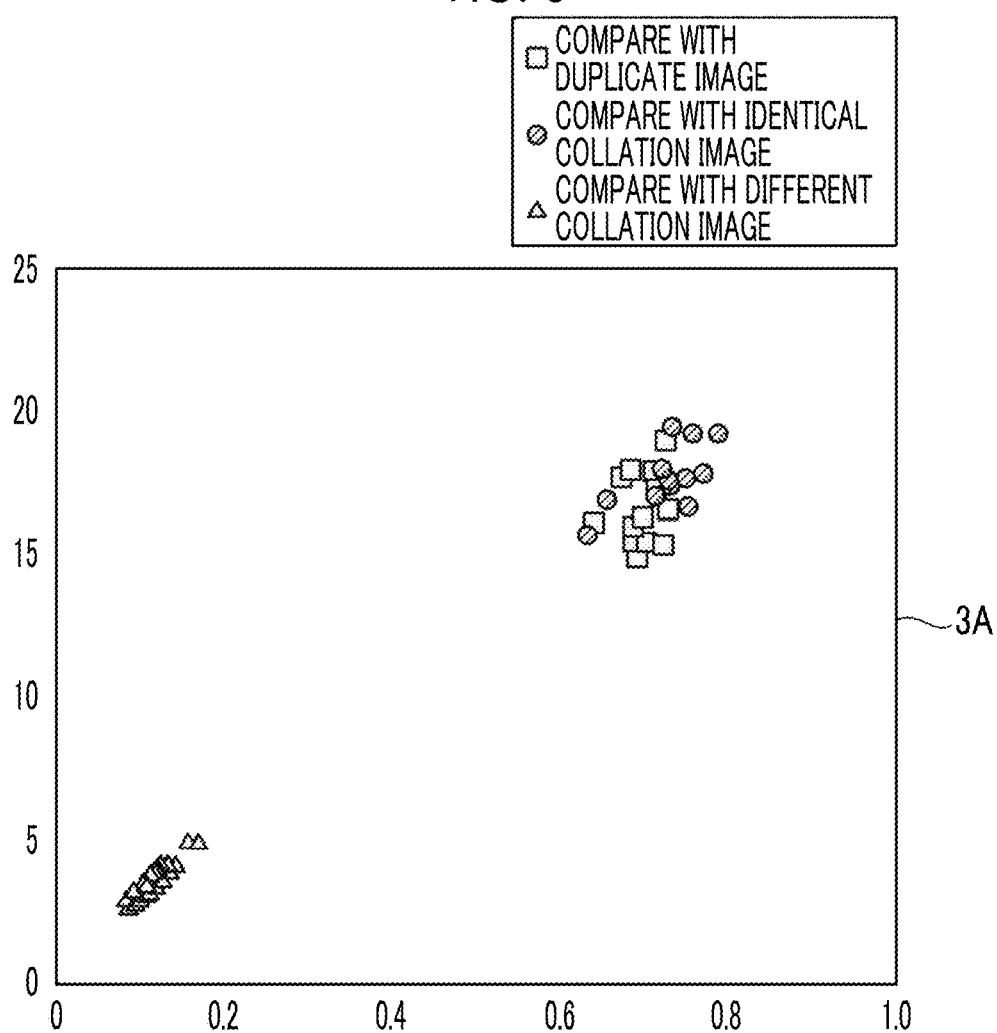

IRRADIATION DIRECTION OF LIGHT

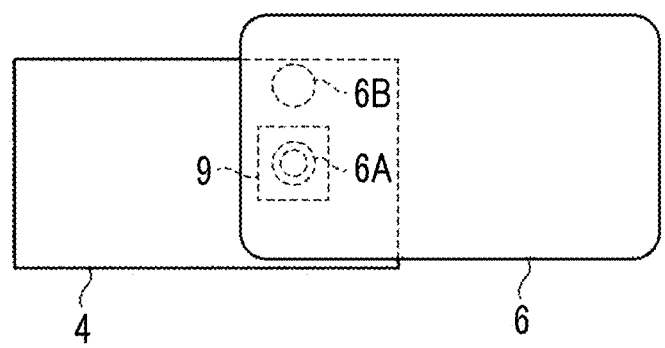
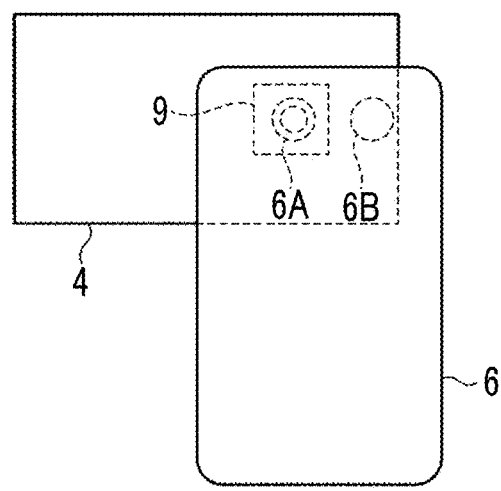

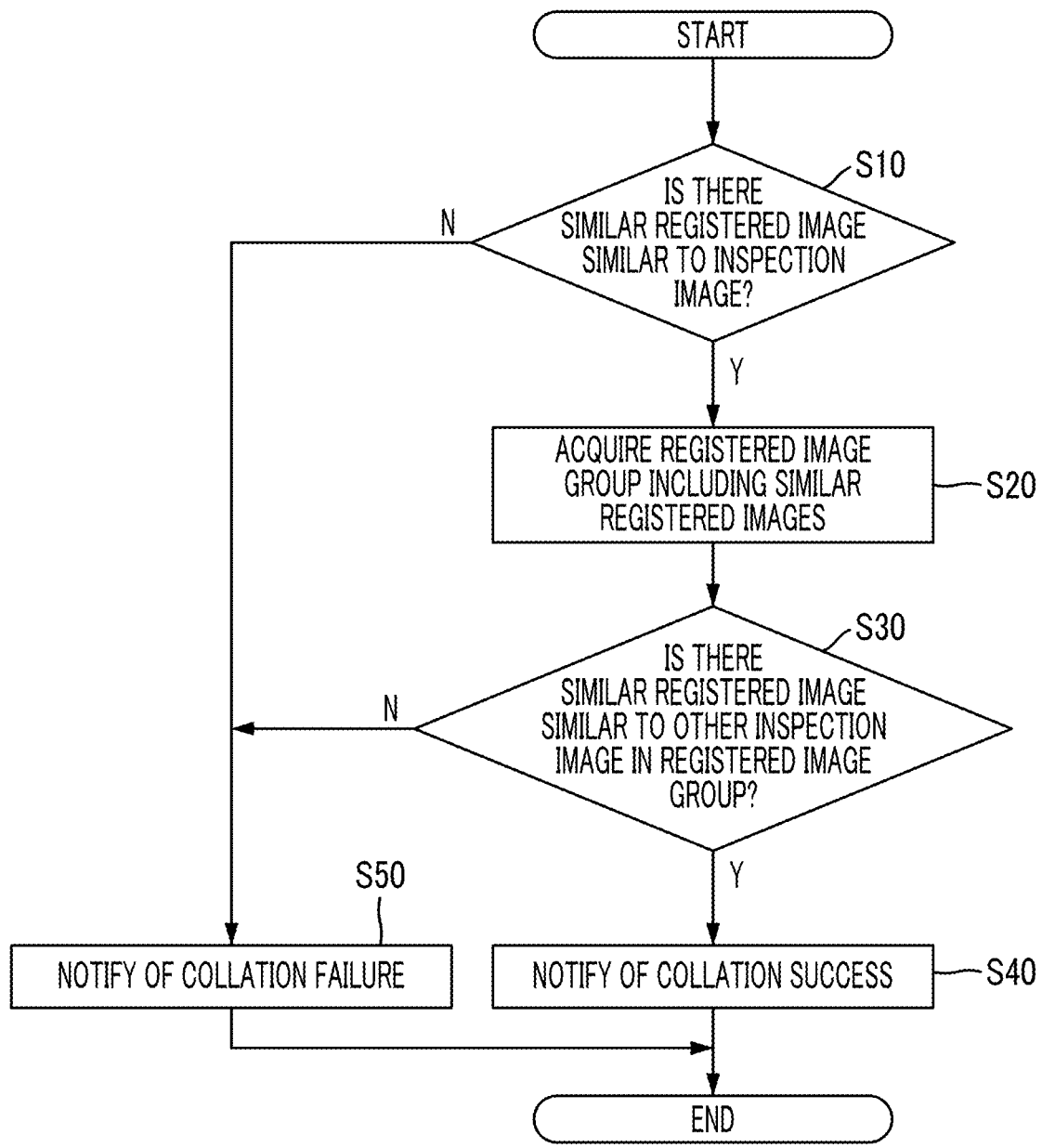

COLLATION DEVICE

CROSS-REFERENCE TO RELATED APPLICATIONS

This application is based on and claims priority under 35 USC 119 from Japanese Patent Application No. 2020-212626 filed Dec. 22, 2020.

BACKGROUND

(i) Technical Field

The present invention relates to a collation device.

(ii) Related Art

JP2004-171109A discloses a device authentication system including a device to be authenticated having a random pattern and a device authentication apparatus that acquires the random pattern of the device to be authenticated and authenticates the authenticity of the device to be authenticated, in which the device to be authenticated has glitter that reflects light embedded in a base material having high light transmissivity, the device authentication apparatus includes a light source that irradiates the device to be authenticated with light, a random pattern scanning unit that scans the random pattern of the device to be authenticated from the image of light reflected by the device to be authenticated, a first data acquisition unit that acquires first ID data unique to the device to be authenticated from the random pattern scanned by the random pattern scanning unit, a second data recording unit that records second ID data for collation for determining the authenticity of the first ID data, a second data acquisition unit that acquires the second ID data recorded in the second data recording unit, and a relationship calculation unit that calculates the relationship between the first ID data and the second ID data and authenticates the authenticity of the device to be authenticated.

JP2020-154946A discloses an object identification device including an image-capturing unit that captures a target location on the surface of an object, an irradiation unit that irradiates the target location with light, a control unit that sequentially switches the direction of the light emitted from the irradiation unit relative to the target location to a plurality of different directions, and controls acquisition of the captured image for each of the plurality of direction, by causing the image-capturing unit to capture the target location in a case where the light is emitted in the direction, for each of the plurality of direction, and an identification unit that identifies the object by collating feature information indicated by the captured image in each of the plurality of directions with feature information registered for each object.

SUMMARY

A collation device has been known that identifies an individual by using a pattern of a collation image formed on the surface of an object as identification information. Such a collation device compares a captured image obtained by capturing an inspection image to be collated with a registered image obtained by capturing the collation image in advance, according to a predetermined collation algorithm, and collates the inspection image with the registered image.

However, even in a case where the inspection image is a genuine collation image, under the different image-capturing conditions of the inspection image and the collation image, it may be determined that the inspection image is not similar to the collation image.

For example, since positions of the camera and the light that irradiates the image in an image-capturing device are different for each model of image-capturing device, and the image-capturing angle of an image is different depending on the photographer, even in a case where the identical area in the identical image is captured, the positional relationship between the image, camera, and light is different, as a result, the appearance of the image changes, and the inspection image may be determined to be dissimilar to the collation image.

Aspects of non-limiting embodiments of the present disclosure relate to a collation device capable of accurately collating whether or not an inspection image is a duplicate of a collation image, as compared with a case where an inspection image captured from one direction is collated with a registered image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a collation device including a processor configured to: acquire a plurality of captured images obtained by capturing an inspection image to be collated, while changing an irradiation direction of light to be emitted; and provide a notification of a collation result between the inspection image included in each of the captured images, and a collation image of which pattern changes depending on the irradiation direction of the light, according to a similarity between a plurality of registered images obtained by capturing in advance the collation image while changing the irradiation direction of the light to be emitted to the collation image, and the inspection image, after adjusting a positional relationship between a camera, a light source, and an image to be identical to a positional relationship between a camera that captures the inspection image at a time of capturing the inspection image, a light source that irradiates the inspection image with light, and the inspection image.

BRIEF DESCRIPTION OF THE DRAWINGS

Exemplary embodiment(s) of the present invention will be described in detail based on the following figures, wherein:

FIG. 3 is a diagram illustrating an example of a graph illustrating a similarity between the collation image and the duplicate image;

FIGS. 18A and 18B are diagrams illustrating an example of another image-capturing mode in the second smartphone;

FIG. 28 is a flowchart illustrating an example of a collation process executed by a CPU of the collation device.

DETAILED DESCRIPTION

Hereinafter, an exemplary embodiment of the present invention will be described in detail with reference to the drawings. The identical components and the identical processes are denoted by the identical reference signs throughout the drawings, and redundant description will be omitted.

Figure 1:
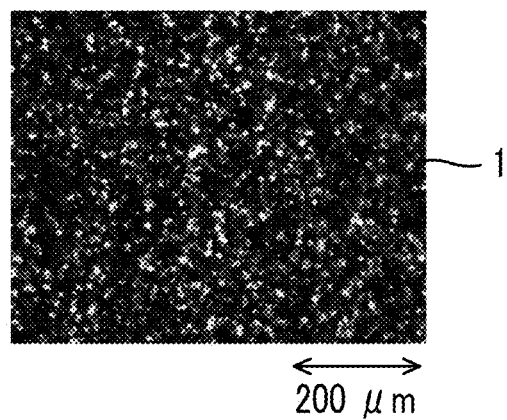
FIG. 1 is an enlarged view of an example of a collation image.

FIG. 1 is an enlarged view of an example of a collation image 1 used in the present exemplary embodiment. The collation image 1 is an image formed on a recording medium 4 (see FIGS. 8A to 8C) by an image forming device that forms an image by using powder such as toner. In the present exemplary embodiment, the collation image 1 is described as being formed on the recording medium 4, but the collation image 1 may be formed on an object other than the recording medium 4, such as a food container. That is, the type of a formation target of the collation image 1 is not limited as long as the formation target is an object on which the collation image 1 can be formed.

For example, in a case where the collation image 1 formed on the recording medium 4 is enlarged using the black powder, as illustrated in FIG. 1, it can be seen that the collation image 1 is a three-dimensional image formed three-dimensionally by aggregating each powder and fixing the powder on the recording medium 4. The three-dimensional image refers to an image in which unevenness equal to or larger than the average particle size of the powder is recognized as shading in the stacking direction of the powder on the recording medium 4, for example. Since there are powders having various average particle sizes, a powder of any average particle size may be used, but the average particle size of the powder forming the collation image 1 in the exemplary embodiment is about 6 μm.

Further, an image formed by mixing metal particles with powder can be used as the collation image 1. An image formed by powder mixed with aluminum particles, which are an example of metal particles, shows a silver color, and a photographic image of powder mixed with brass particles, which are also an example of metal particles, shows a gold color.

Since the powder constituting the collation image 1 contains metal particles such as aluminum, in a case where the collation image 1 is irradiated with light, the light is reflected by the randomly laminated powder metal particles, and the collation image 1 displays a pattern of shading according to the intensity of the reflected light. Therefore, in a case where the object is associated with the collation image 1 by attaching the collation image 1 formed on the recording medium 4 to the object, or directly forming the collation image 1 on the object by the image forming device, by discriminating the pattern, the object associated with the collation image 1 can be identified.

However, for example, since the performance of an information equipment with a camera function and an image forming device represented by the smartphone 6 (see FIG. 7) is improved, in a case where the genuine collation image 1 is captured by the smartphone 6 and the captured collation image 1 is formed on a recording medium by an image forming device, a duplicate image 2 can be obtained by duplicating the collation image 1. Specifically, in a case where a smartphone 6 having a resolution of a captured image of 1000 dpi or an inkjet printer that forms an image with a resolution of 4800 dpi is used, a duplicate image 2 showing the characteristics of the pattern of the collation image 1 is formed.

Figure 2:
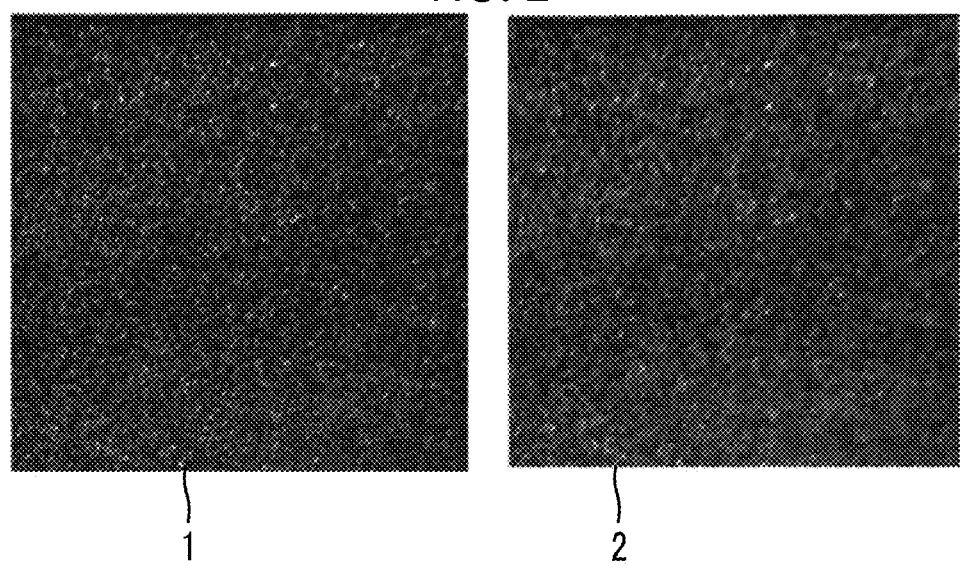
FIG. 2 is a diagram illustrating an example of a genuine collation image and a duplicate image obtained by duplicating the collation image.

FIG. 2 is a diagram illustrating an example of a genuine collation image 1 and a duplicate image 2 of the collation image 1 created by using the smartphone 6 and an inkjet printer as described above. The collation image 1 and the duplicate image 2 illustrated in FIG. 2 are images captured at a resolution of 1012 dpi, respectively.

The duplicate image 2 illustrated in FIG. 2 is less clear than the genuine collation image 1, but it can be seen that the characteristics of a pattern of shading of the collation image 1 are reproduced on the duplicate image 2.

In the present exemplary embodiment, the rectangular collation image 1 is used for explanation, but the shape of the collation image 1 is not limited, and other shapes such as a circle, an ellipse, and a polygon may be used.

FIG. 3 is a graph 3A illustrating an example of a calculation result obtained by calculating the similarity between the collation image 1 and the duplicate image 2 illustrated in FIG. 2 by using a known collation algorithm such as Zero-mean Normalized Cross-Correlation (ZNCC). Here, as an example, the resolutions of the collation image 1 and the duplicate image 2 illustrated in FIG. 2 are converted to 600 dpi, respectively, and then the similarity is calculated. Further, the collation algorithm used for calculating the similarity may improve the accuracy of calculating the similarity by combining a plurality of methods. As an example, the similarity between the collation image 1 and the duplicate image 2 is calculated by two methods.

In FIG. 3, the vertical axis shows the similarity calculated by a first method, and the horizontal axis shows the similarity calculated by a second method. On both the vertical and horizontal axes, the larger the numerical value, the more similar the images. Therefore, it is illustrated that the images are similar to each other toward the upper right along the diagonal line of the graph 3A, and that the images are not similar to each other toward the lower left of the graph 3A.

"☐" in FIG. 3 is a point indicating the result of calculating the similarity between the collation image 1 and the duplicate image 2 for each corresponding portion. Since the points of "☐" are concentrated in the upper right area of the graph 3A, it can be seen that the collation image 1 and the duplicate image 2 are similar to each other.

"○" in FIG. 3 is a point indicating the result of calculating the similarity between images obtained by capturing the identical collation image 1 twice, for each corresponding portion. As a matter of course, since the identical collation images 1 are compared with each other, it is illustrated that the collation images 1 are similar to each other.

Further, "Δ" in FIG. 3 is a point indicating the result of calculating the similarity between different collation images 1, for each corresponding portion. As a matter of course, with respect to the different collation images 1, the points of "Δ" indicating the similarity are concentrated in the lower left area of the graph 3A, indicating that the collation images 1 are not similar to each other.

As illustrated in FIG. 3, the similarity between the collation image 1 and the duplicate image 2 shows the identical similarity as the similarity between the identical collation images 1, so that it can be seen that a duplicate of the collation image 1 can be created with a precision that cannot be discriminated from the collation image 1.

However, the pattern of shading appearing in the collation image 1 composed of the powder reflects the shadow of the surface unevenness, and even in a case where the collation image 1 is the identical, the pattern of the collation image 1 is changed by changing the irradiation direction of light. Since the powder tends to aggregate in units of, for example, several tens of µm, the pattern of the collation image 1 also tends to change depending on the width of the aggregation unit.

The collation image 1 composed of the powder mixed with the metal particles reflects that the minute surfaces of the metal particles causing specular reflection are randomly placed, and even in a case of the identical collation image 1, the pattern of the collation image 1 is changed by changing the irradiation direction of light. In a case where particles of about several µm to 10 µm are used, the brightness tends to change in units of several tens of µm.

Figure 4A:
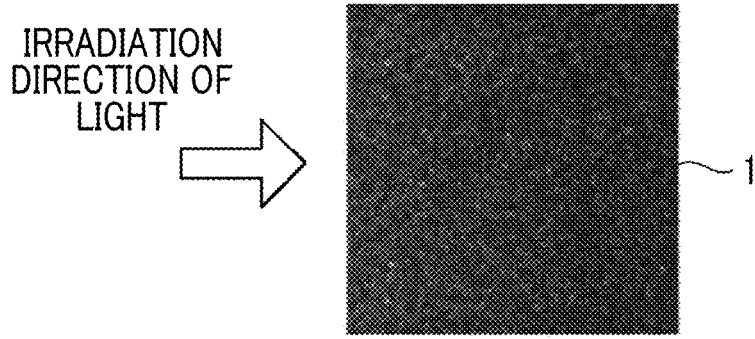
FIGS. 4A and 4B are diagrams illustrating an example of a collation image to be irradiated from the left.
Figure 4B:
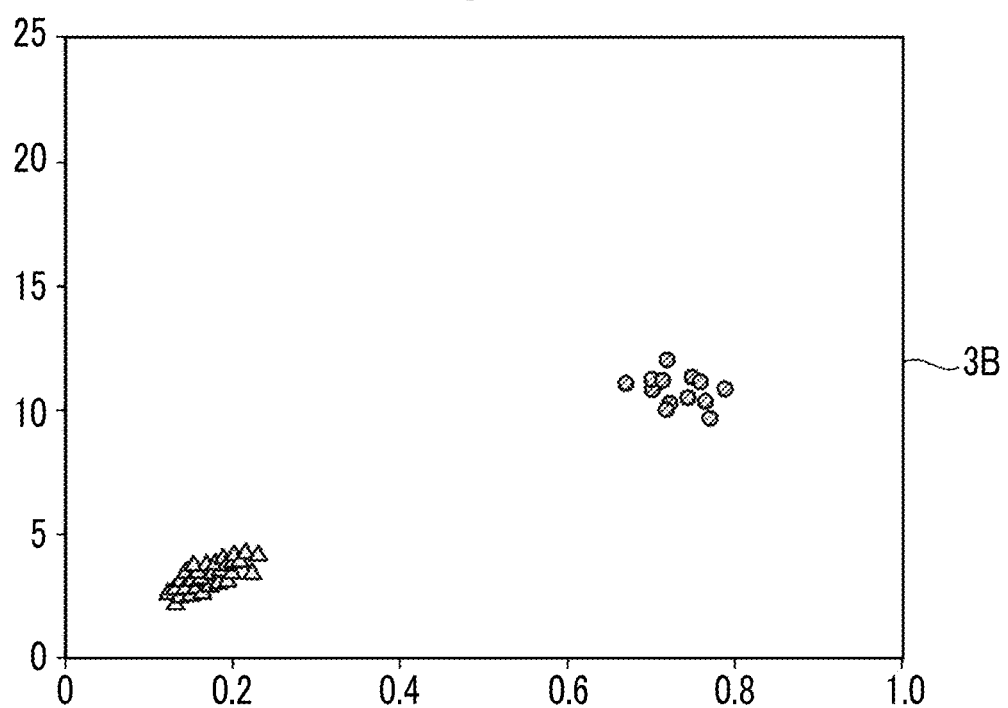

In FIGS. 4A and 4B, FIG. 4A is a diagram illustrating an example of the collation image 1 in the case where light is emitted from the upper left (diagonally upward left) toward the collation area, along the direction orthogonal to the left side of the collation image 1. Hereinafter, such a light irradiation form is referred to as "emitting light from the left direction".

FIG. 4B is an example of a graph 3B showing the results (indicated by "○") of calculating the similarity between the captured collation images 1, which are obtained by capturing the collation image 1 illustrated in FIG. 4A twice, for each corresponding location, and the results (indicated by "Δ") of calculating the similarity between the collation image 1 illustrated in FIG. 4A and another collation image 1 obtained by capturing the collation image 1 different from the collation image 1 in FIG. 4A by emitting light from the left direction of the collation image 1, for each corresponding location. The meanings represented by the vertical axis and the horizontal axis in the graph 3B are the identical as the meanings of the graph 3A illustrated in FIG. 3.

That is, it can be seen from the graph 3B of FIG. 4B that in a case where the light irradiation directions are the identical, it is determined that the identical collation images 1 captured are similar to each other, and even in a case where the light irradiation directions are the identical, the different collation images 1 are not similar to each other.

Figure 5A:
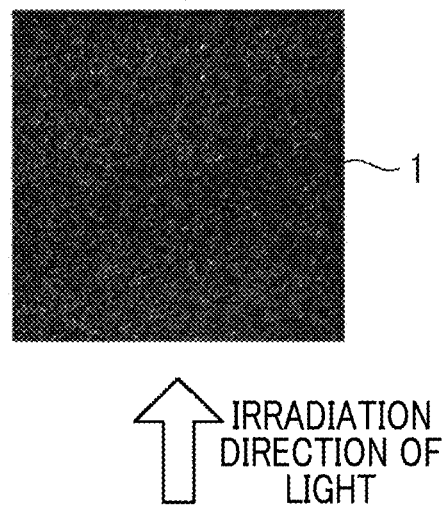
FIGS. 5A and 5B are diagrams illustrating an example of a collation image to be irradiated from the lower.
Figure 5B:
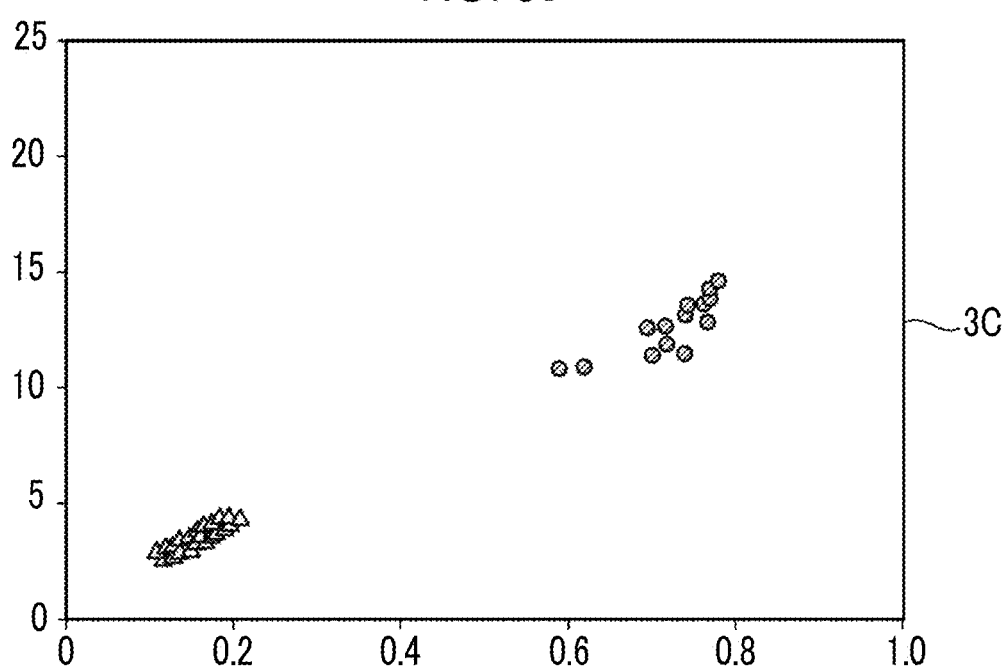

On the other hand, in FIGS. 5A and 5B, FIG. 5A is a diagram illustrating an example of the collation image 1, which is the identical as the collation image 1 illustrated in FIG. 4A, in the case where light is emitted from diagonally upward toward the collation area, along the direction orthogonal to the bottom of the collation image 1. Hereinafter, such a light irradiation form is referred to as "emitting light from the lower direction".

FIG. 5B is an example of a graph 3C showing the results (indicated by "○") of calculating the similarity between the captured collation images 1, which are obtained by capturing the collation image 1 illustrated in FIG. 5A twice, for each corresponding location, and the results (indicated by "Δ") of calculating the similarity between the collation image 1 illustrated in FIG. 5A and another collation image 1 obtained by capturing the collation image 1 different from the collation image 1 in FIG. 5A by emitting light from the below of the collation image 1, for each corresponding location. The meanings represented by the vertical axis and the horizontal axis in the graph 3C are the identical as the meanings of the graph 3A illustrated in FIG. 3.

Even in this case, it can be seen from the graph 3C of FIG. 5B that in a case where the light irradiation directions are the identical, it is determined that the identical collation images 1 captured are similar to each other, and even in a case where the light irradiation directions are the identical, the different collation images 1 are not similar to each other.

Figure 6:
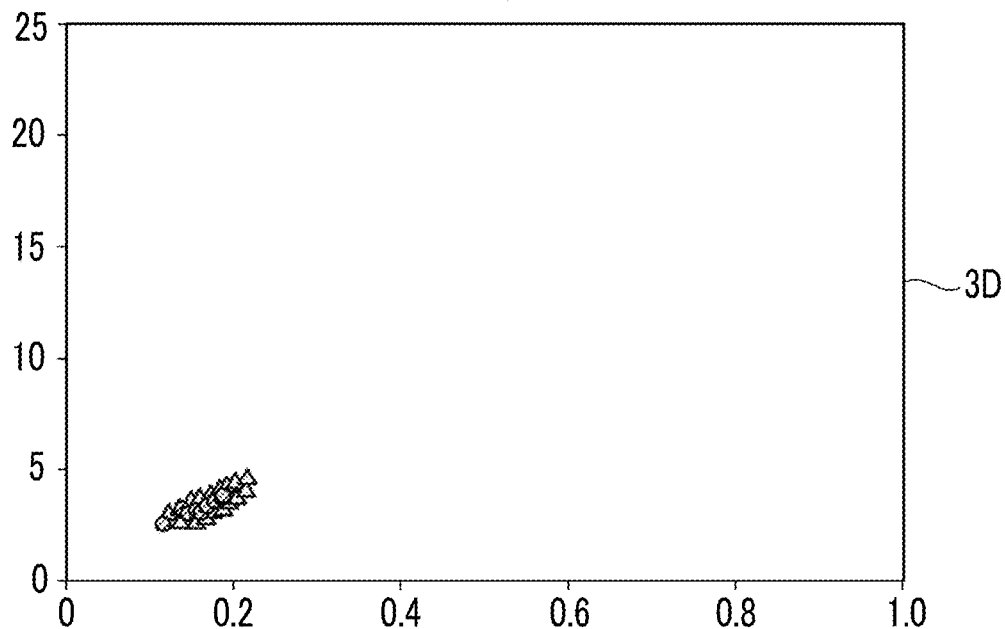
FIG. 6 is an example of a graph illustrating a similarity between the collation image to be irradiated from the left and the collation image to be irradiated from the lower.

On the other hand, FIG. 6 is an example of a graph 3D showing the results (indicated by "○") of calculating the similarity between the collation image 1 illustrated in FIG. 4A and the collation image 1 illustrated in FIG. 5A, that is, the similarity between the identical collation images 1 in a case where light is emitted from different directions, for each corresponding location, and the results (indicated by "Δ") of calculating the similarity between different collation images 1 in a case where light is emitted from the identical direction, for each corresponding location.

From FIG. 6, it can be seen that even in a case where the collation images 1 are the identical, in a situation where light irradiation directions are different, it is determined that the collation images 1 are different to the identical extent as the different collation images 1.

In the present exemplary embodiment, a collation system 5 will be described that collates whether or not the image to be collated, captured by the image-capturing device, (referred to as "inspection image 9") is similar to the collation image 1, by using the property of the collation image 1 that even in a case of the identical collation image 1, the similarity between the collation images 1 changes depending on the irradiation direction of light.

The image-capturing device for capturing the inspection image 9 may be any type of image-capturing device as long as an image-capturing device is provided with the camera 6A and one light source 6B for emitting light (see FIG. 8A), but in the exemplary embodiment, an example of capturing the inspection image 9 by using the smartphone 6 will be described. The smartphone 6 is an example of the second image-capturing device.

Figure 7:
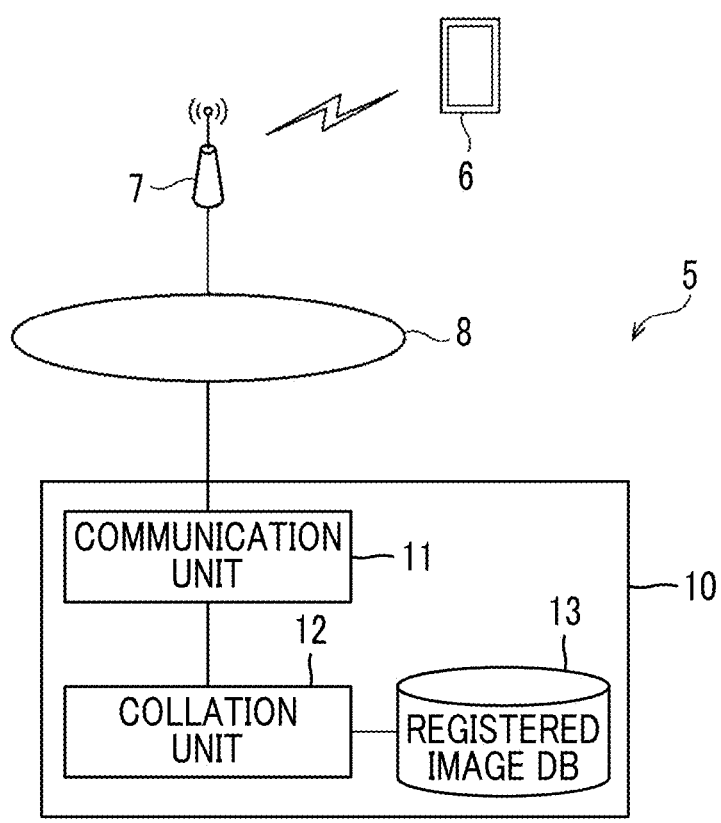
FIG. 7 is a configuration diagram illustrating an example of a collation system.

FIG. 7 is a configuration diagram illustrating an example of the collation system 5 according to the present exemplary embodiment. The collation system 5 includes a smartphone 6 that captures the inspection image 9, and a collation device 10 that collates the inspection image 9 included in the captured image with the collation image 1. The smartphone 6 is connected to the communication line 8 through, for example, the wireless base station 7, and is connected to the collation device 10 also connected to the communication line 8. The communication line 8 may be a wired line or a wireless line, and may be a dedicated line or a public line.

For convenience of explanation, only one smartphone 6 is illustrated in FIG. 7, but in reality, a plurality of smartphones 6 may be connected to the collation device 10.

The collation device 10 includes respective functional unit of the communication unit 11 and the collation unit 12, and a registered image database (DB) 13.

The communication unit 11 performs data communication with the smartphone 6 through the communication line 8. Specifically, the communication unit 11 acquires, from the smartphone 6, a plurality of captured images obtained by capturing the inspection image 9 while changing the irradiation direction of the emitted light, and delivers each of the acquired captured images to the collation unit 12.

In a case of receiving the captured image from the communication unit 11, the collation unit 12 calculates the similarity between the inspection image 9 included in the captured image and the collation image 1 included in the registered image registered in advance in the registered image DB 13, for each of the received captured images, by using a known collation algorithm. Then, the collation unit 12 notifies the communication unit 11 of the collation result between the inspection image 9 included in the captured image and the collation image 1 included in the registered image.

Here, the registered image is an image obtained by capturing the collation image 1 while changing the light irradiation direction, for each collation image 1 whose pattern changes depending on the light irradiation direction, and is an image that is the original of the collation image 1. As can be seen from the fact that the collation image 1 is captured while changing the light irradiation direction for each collation image 1, there are a plurality of registered images, for one collation image 1. Hereinafter, a plurality of registered images obtained from one collation image 1 will be referred to as a "registered image group".

That is, a registered image group exists for each collation image 1, and the registered images included in each registered image group are registered in the registered image DB 13 in units of registered image groups. Further, information in which the collation image 1 and the registered image group are associated is managed in the registered image DB 13 such that it can be seen that each registered image group is a registered image group obtained by capturing which collation image 1.

In a case where the inspection images 9 respectively included in the plurality of captured images are respectively similar to the plurality of registered images included in one specific registered image group, the collation unit 12 collates the inspection image 9 included in each captured image with an image obtained by capturing the collation image 1 corresponding to the specific registered image group while changing the light irradiation direction.

The communication unit 11 that has received the collation result from the collation unit 12 transmits the received collation result to, for example, the smartphone 6 that has transmitted the captured image. Thus, the smartphone 6 is notified of the collation result indicating whether or not the captured inspection image 9 matches the collation image 1 included in any of the registered images registered in the registered image DB 13.

In a case where the inspection image 9 captured by the user is a duplicate image 2 obtained by duplicating the collation image 1 with an inkjet printer, the duplicate image 2 is not a three-dimensional image but a flat image. Therefore, even in a case where the duplicate image 2 is captured while changing the light irradiation direction, the pattern of the duplicate image 2 included in the captured image does not change, and a plurality of captured images obtained by capturing the duplicate image 2 showing the identical pattern are obtained.

In this case, the registered image showing the identical pattern as the duplicate image 2 included in any one of the captured images exists in the registered image DB 13. However, since the pattern of the duplicate image 2 included in the other captured image is the identical as the pattern of the duplicate image 2 included in the previous one captured image, the registered image representing the identical pattern as the pattern of each duplicate image 2 included in the other captured image does not exist in the registered image group other than the previous registered image. Therefore, since the duplicate images 2 included in the plurality of captured images are not respectively similar to the plurality of registered images included in one specific registered image group, the inspection image 9 captured by the user is a duplicate of the collation image 1, and the collation device 10 can collate the authenticity of the collation image 1.

The registered image DB 13 does not necessarily need to be included in the collation device 10, and may be included in an external device (not illustrated) connected to the communication line 8. In this case, the collation device 10 refers to the registered image DB 13 included in the external device (not illustrated) through the communication line 8 as necessary.

Next, an image-capturing mode of the registered image used for collation of the collation image 1 will be described. For that purpose, first, an image-capturing mode for capturing the inspection image 9 to be collated by using the smartphone 6 will be described.

Figure 8A:
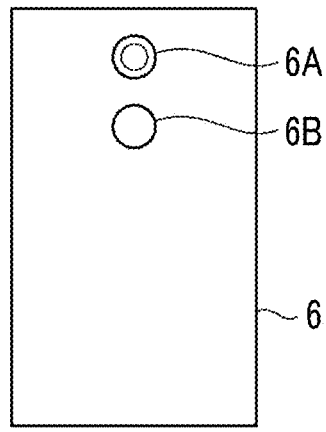
FIGS. 8A and 8B are diagrams illustrating an example of an image-capturing mode of an inspection image by a smartphone.
Figure 8B:
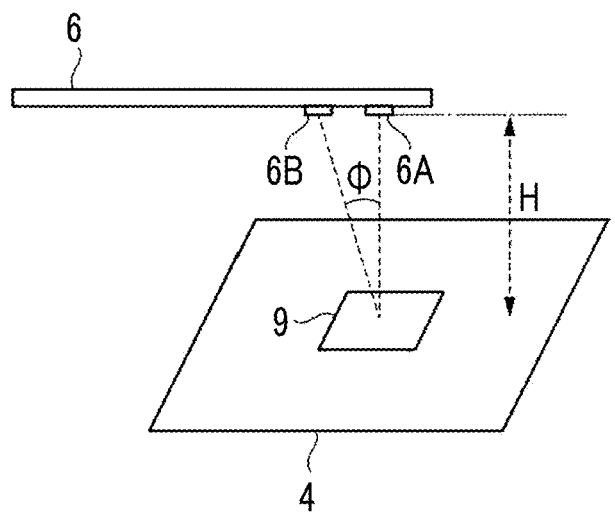

FIGS. 8A and 8B are diagrams illustrating an example of an image-capturing mode of the inspection image 9 by the smartphone 6. As illustrated in FIG. 8A, the smartphone 6 has a camera 6A and a light source 6B built in. As the light source 6B, a point light source that irradiates light from one point is used. That is, the light source 6B is an example of a built-in point light source. The light source 6B may be a light source in which one or a plurality of Light Emitting Diodes (LEDs) are centrally placed.

As illustrated in FIG. 8B, the user captures the inspection image 9 by directing the surface (referred to as "the image-capturing surface of smartphone 6") of the smartphone 6 on which the camera 6A is placed toward the inspection image 9 such that the camera 6A of the smartphone 6 faces the inspection image 9 to be collated.

An image-capturing environment that affects the image-capturing state of the inspection image 9, such as the size of the inspection image 9 included in the captured image, the illuminance distribution on the inspection image 9 irradiated by the light emitting from the light source 6B, and the irradiation angle of the light by the light source 6B changes, depending on the angle between the optical axis of the camera 6A and the optical axis of the light source 6B (referred to as "irradiation angle φ"), and the distance between the image-capturing surface of the smartphone 6 and the inspection image 9 (referred to as "image-capturing distance H").

Figure 9:
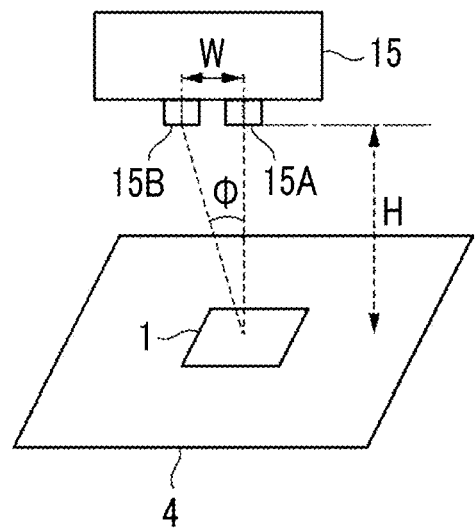
FIG. 9 is a diagram illustrating an example of an image-capturing mode of a collation image by a dedicated equipment.

In order to collate the inspection image 9 included in the captured image captured in this way with the collation image 1 with high accuracy, for example, as illustrated in FIG. 9, an image-capturing is performed by bring the irradiation angle φ and the image-capturing distance H in a case where the collation image 1 is captured by using the dedicated equipment 15 close to the irradiation angle φ and the image-capturing distance H in a case where the user captures the inspection image 9 by using the smartphone 6.

Therefore, in the dedicated equipment 15, the distance (referred to as "device distance W") between the center of the lens of the camera 15A and the center of the irradiation surface of the light source 15B in the dedicated equipment 15 can be changed. The photographer of the registered image adjusts the device distance W after making the image-capturing distance H of the dedicated equipment 15 close to the image-capturing distance H in a case of image-capturing using the smartphone 6, and brings the irradiation angle φ of the dedicated equipment 15 close to the irradiation angle φ in a case of image-capturing using the smartphone 6.

Although it depends on the model of the smartphone 6, in a case where the image-capturing distance H is 100 mm, the smartphone 6 is likely to capture an image having the highest resolution defined by the smartphone 6. In a case where the image-capturing distance H is longer than 100 mm, the size of the inspection image 9 included in the captured image becomes small, and it becomes difficult to collate the inspection image 9 with the registered image. On the other hand, in a case where the image-capturing distance H is shorter than 100 mm, the inspection image 9 is out of focus of the camera 6A, and the resolution of the inspection image 9 tends to decrease.

Therefore, the image-capturing distance H in the dedicated equipment 15 is set within the adjustment range of, for example, 100 mm±α mm (α is a real number). α is a predetermined length indicating a fluctuation range in which an image having a resolution that can be regarded as the highest resolution is obtained by the smartphone 6.

On the other hand, even in a case where the models are different, the device distance W in the smartphone 6 tends to be within the range of about 10 mm or more and 15 mm or less, due to the relationship between the sizes of the camera 15A and the light source 15B and the size of the smartphone 6. Therefore, the device distance W of the dedicated equipment 15 is also set to about 10 mm or more and 15 mm or less accordingly.

In addition, one point light source is often used for the light source 6B of the smartphone 6. Therefore, in order to bring the illuminance distribution of the light source 15B of the dedicated equipment 15 closer to the illuminance distribution of the light source 6B of the smartphone 6, for example, the light source 15B of the dedicated equipment 15 is also one point light source.

Next, the irradiation direction of the light emitted from the light source 15B in a case where a plurality of registered images are captured by the dedicated equipment 15 will be examined.

As described above, the pattern of the collation image 1 is changed by changing the irradiation direction of the light, and it is determined that even the identical collation image 1 is different collation image 1.

Therefore, in order to collate the inspection image 9 included in the captured image captured by the smartphone 6 with the collation image 1 included in the registered image, it is necessary to capture the collation image 1 with the dedicated equipment 15 by emitting light from the light source 15B of the dedicated equipment 15 in the identical direction as the direction of the light emitted in a case where the inspection image 9 is captured by the smartphone 6.

In particular, in a case where the inspection image 9 is captured by using the smartphone 6 in which the camera 6A and the light source 6B are placed such that the straight line connecting the centers of the camera 6A and the light source 6B is orthogonal to any contour line of the smartphone 6, a plurality of registered images obtained by capturing the collation image 1 by emitting light from at least two different directions may be prepared in advance.

The placement of the camera 6A and the light source 6B such that the straight line connecting the centers of the camera 6A and the light source 6B is orthogonal to any contour line of the smartphone 6 is referred to as "orthogonal placement".

In a situation where a smartphone 6 in which the camera 6A and the light source 6B are placed orthogonally is used, in a case where, for example, a registered image obtained by capturing the collation image 1 to be irradiated from the left and a registered image obtained by capturing the collation image 1 to be irradiated from the lower are prepared, for example, the inspection image 9 included in the captured image and the collation image 1 included in the registered image can be collated regardless of the relative positions of the camera 6A and the light source 6B.

Irradiating an image with light from the left to the right direction by placing the light source 6B on the left side of the camera 6A for some images such as the collation image 1 and the inspection image 9 is called "left irradiation", irradiating an image with light from the right to the left direction by placing the light source 6B on the right side of the camera 6A is called "right irradiation", irradiating an image with light from the upper side to the lower side by placing the light source 6B on the upper side of the camera 6A is called "upper irradiation", and irradiating an image with light from the lower side to the upper side by placing the light source 6B on the lower side of the camera 6A is called "lower irradiation".

Figure 10A:
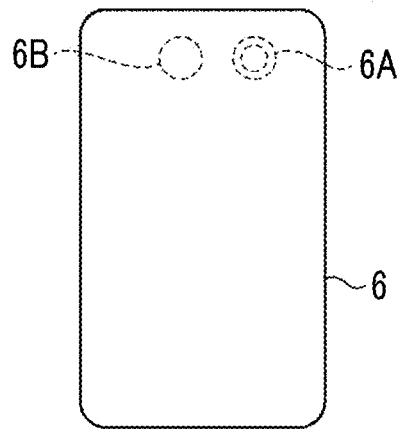
FIGS. 10A to 10C are diagrams illustrating an example of an image-capturing mode of a first smartphone provided with an orthogonal placement.
Figure 10B:
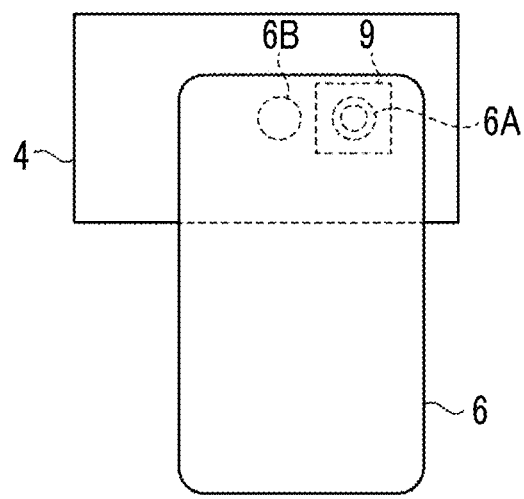
Figure 10C:
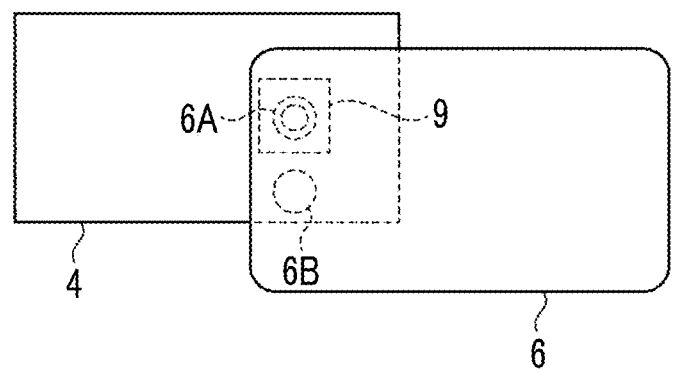

FIGS. 10A to 10C are diagrams illustrating an example of the light irradiation direction of the first smartphone 6 in which the camera 6A and the light source 6B are placed orthogonally.

FIG. 10A is a view of the smartphone 6 viewed from the surface opposite to the image-capturing surface of the smartphone 6, that is, the operation surface on which the screen is placed. In the smartphone 6 of FIG. 10A, the camera 6A and the light source 6B are placed along the short side of the contour line of the smartphone 6, and in the upper half of the smartphone 6, the camera 6A is placed on the right side and the light source 6B is placed on the left side, as viewed from the operation surface of the smartphone 6. As viewed from the operation surface of the smartphone 6, the camera 6A and the light source 6B cannot be seen directly, and are therefore illustrated by dotted lines.

FIG. 10B is a diagram illustrating an example of the placement of the smartphone 6 in a case where the inspection image 9 to be irradiated from the left is captured by the smartphone 6 of FIG. 10A.

FIG. 10C is a diagram illustrating an example of the placement of the smartphone 6 in a case where the inspection image 9 to be irradiated from the lower is captured by the smartphone 6 of FIG. 10A.

Figure 11A:
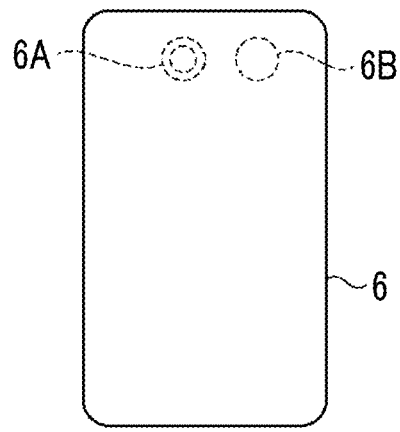
FIGS. 11A to 11C are diagrams illustrating an example of an image-capturing mode of a second smartphone provided with an orthogonal placement.
Figure 11B:
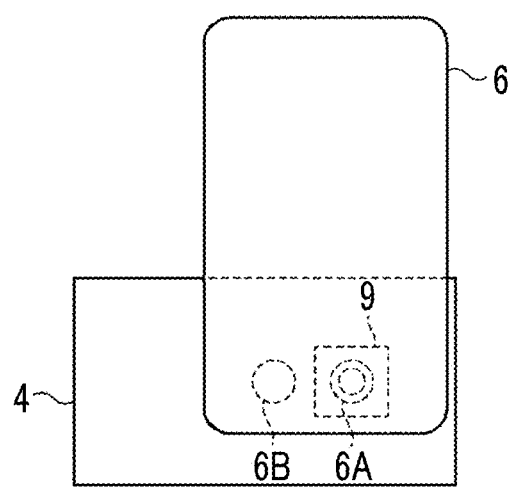
Figure 11C:
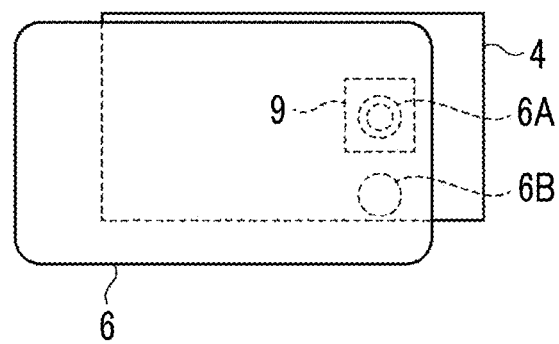

FIGS. 11A to 11C are diagrams illustrating an example of the light irradiation direction of a second smartphone 6 in which the camera 6A and the light source 6B are placed orthogonally.

As illustrated in FIG. 11A, in the smartphone 6 of FIGS. 11A to 11C, the camera 6A and the light source 6B are placed along the short side of the contour line of the smartphone 6, and in the upper half of the smartphone 6, the camera 6A is placed on the left side and the light source 6B is placed on the right side, as viewed from the operation surface of the smartphone 6.

FIG. 11B is a diagram illustrating an example of the placement of the smartphone 6 in a case where the inspection image 9 to be irradiated from the left is captured by the smartphone 6 of FIG. 11A.

FIG. 11C is a diagram illustrating an example of the placement of the smartphone 6 in a case where the inspection image 9 to be irradiated from the lower is captured by the smartphone 6 of FIG. 11A.

Figure 12A:
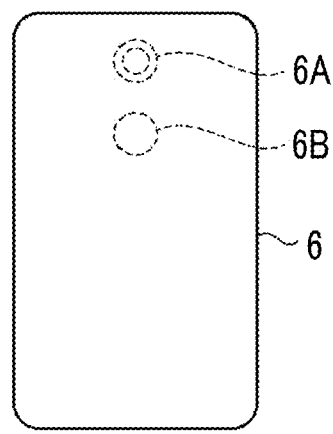
FIGS. 12A to 12C are diagrams illustrating an example of an image-capturing mode of a third smartphone provided with an orthogonal placement.
Figure 12B:
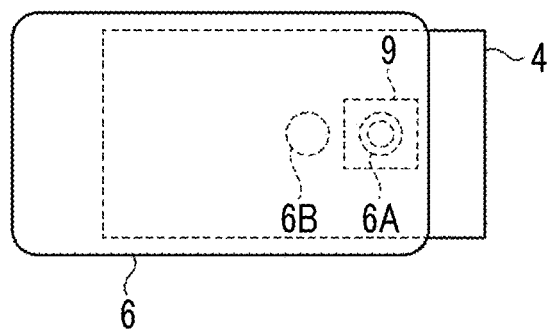
Figure 12C:
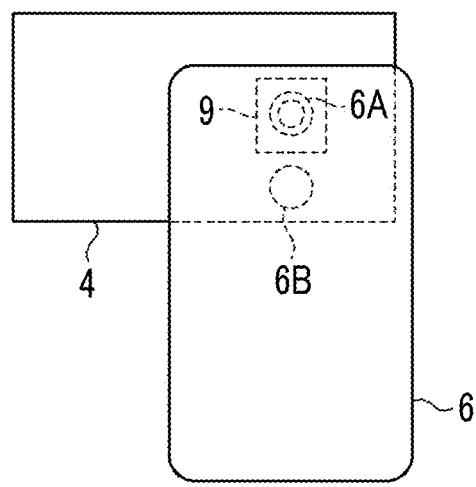

FIGS. 12A to 12C are diagrams illustrating an example of the light irradiation direction of a third smartphone 6 in which the camera 6A and the light source 6B are placed orthogonally.

As illustrated in FIG. 12A, in the smartphone 6 of FIGS. 12A to 12C, the camera 6A and the light source 6B are placed along the long side of the contour line of the smartphone 6, and in the upper half of the smartphone 6, the camera 6A is placed on the upper side and the light source 6B is placed on the lower side, as viewed from the operation surface of the smartphone 6.

FIG. 12B is a diagram illustrating an example of the placement of the smartphone 6 in a case where the inspection image 9 to be irradiated from the left is captured by the smartphone 6 of FIG. 12A.

FIG. 12C is a diagram illustrating an example of the placement of the smartphone 6 in a case where the inspection image 9 to be irradiated from the lower is captured by the smartphone 6 of FIG. 12A.

Figure 13A:
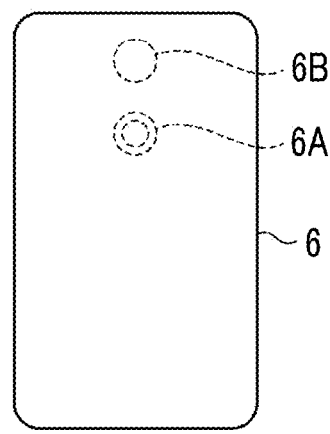
FIGS. 13A to 13C are diagrams illustrating an example of an image-capturing mode of a fourth smartphone provided with an orthogonal placement.
Figure 13B:
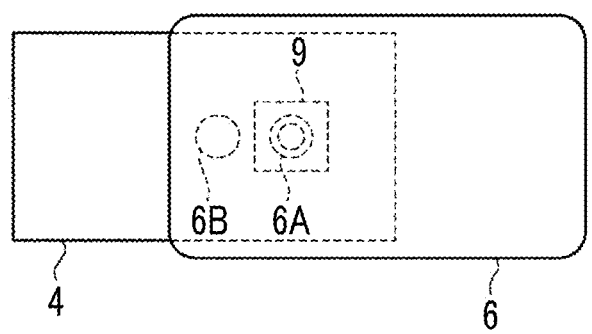
Figure 13C:
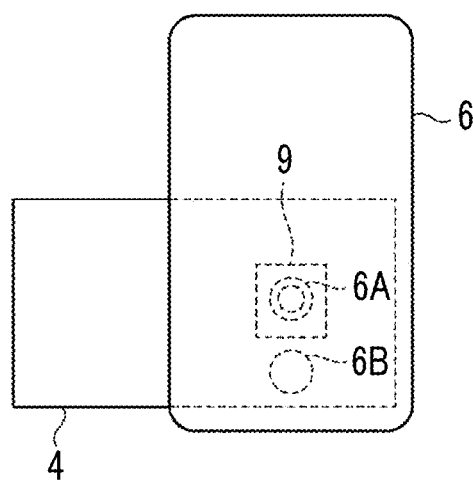

FIGS. 13A to 13C are diagrams illustrating an example of the light irradiation direction of a fourth smartphone 6 in which the camera 6A and the light source 6B are placed orthogonally.

As illustrated in FIG. 13A, in the smartphone 6 of FIGS. 13A to 13C, the camera 6A and the light source 6B are placed along the long side of the contour line of the smartphone 6, and in the upper half of the smartphone 6, the camera 6A is placed on the lower side and the light source 6B is placed on the upper side, as viewed from the operation surface of the smartphone 6.

FIG. 13B is a diagram illustrating an example of the placement of the smartphone 6 in a case where the inspection image 9 to be irradiated from the left is captured by the smartphone 6 of FIG. 13A.

FIG. 13C is a diagram illustrating an example of the placement of the smartphone 6 in a case where the inspection image 9 to be irradiated from the lower is captured by the smartphone 6 of FIG. 13A.

In placing the smartphone 6 with respect to the inspection image 9 as illustrated in FIGS. 10 to 13, a captured image obtained by capturing the inspection image 9 to be irradiated from the left and a captured image obtained by capturing the inspection image 9 to be irradiated from the lower, by the smartphone 6 in which the camera 6A and the light source 6B are placed orthogonally with each other, are obtained.

The smartphone 6 may display a guide for assisting the user in capturing the inspection image 9 such that the image-capturing condition in a case where the user captures the inspection image 9 with the smartphone 6 approaches the image-capturing condition in a case where the user captures the collation image 1 with the dedicated equipment 15.

The image-capturing condition is a condition that defines the positional relationship between the camera 6A and the light source 6B of the smartphone 6 and the inspection image 9. Specifically, the smartphone 6 may display information notifying that the irradiation angle φ of the light source 6B and the image-capturing distance H of the camera 6A are approaching the irradiation angle φ of the light source 15B and the image-capturing distance H of the camera 15A in a case where the collation image 1 is captured by the dedicated equipment 15, on the screen of the smartphone 6.

On the other hand, the placement of the camera 6A and the light source 6B in the smartphone 6 is not limited to the orthogonal placement. For example, there is also a smartphone 6 of an "inclined placement" in which the camera 6A and the light source 6B are placed such that the angle formed by the straight line connecting the centers of the camera 6A and the light source 6B and any contour line of the smartphone 6 intersects at an angle other than 90 degrees.

Figure 14A:
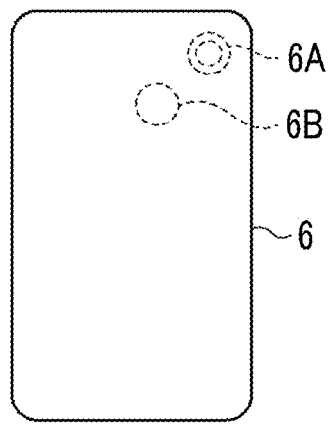
FIGS. 14A to 14C are diagrams illustrating an example of an image-capturing mode of a fifth smartphone of an inclined placement.
Figure 14B:
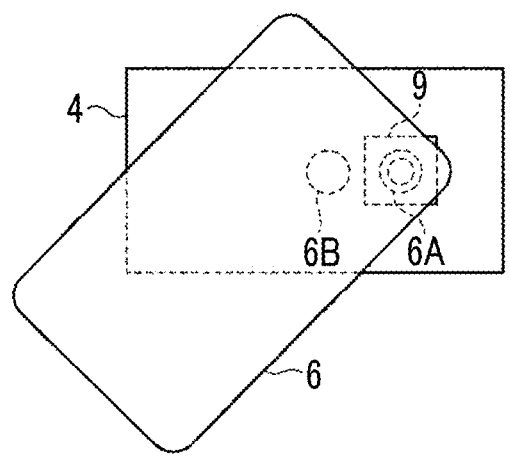
Figure 14C:
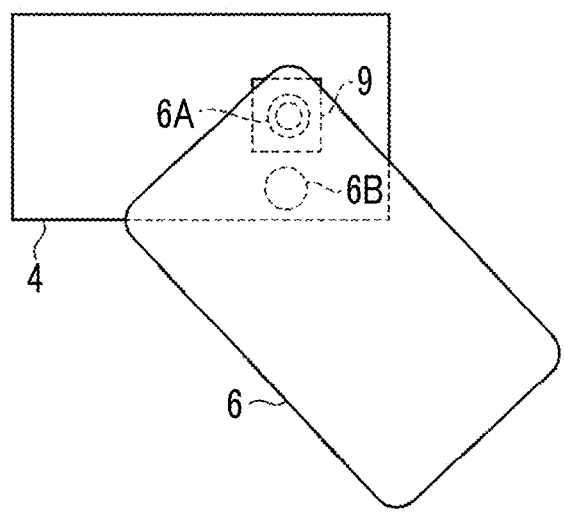

FIGS. 14A to 14C are diagrams illustrating an example of the light irradiation direction of a fifth smartphone 6 in which the camera 6A and the light source 6B are placed in an inclined manner.

As illustrated in FIG. 14A, in the smartphone 6 of FIGS. 14A to 14C, the light source 6B is placed in the diagonally lower left direction from the position of the camera 6A placed in the upper half of the smartphone 6, as viewed from the operation surface of the smartphone 6.

FIG. 14B is a diagram illustrating an example of the placement of the smartphone 6 in a case where the inspection image 9 to be irradiated from the left is captured by the smartphone 6 of FIG. 14A.

FIG. 14C is a diagram illustrating an example of the placement of the smartphone 6 in a case where the inspection image 9 to be irradiated from the lower is captured by the smartphone 6 of FIG. 14A.

Figure 15A:
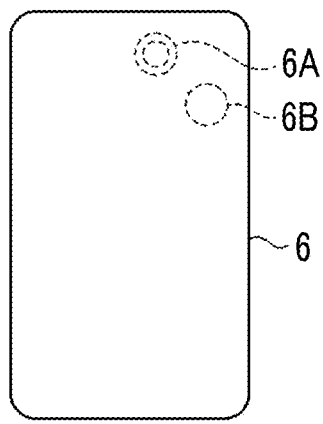
FIGS. 15A to 15C are diagrams illustrating an example of an image-capturing mode of a sixth smartphone of an inclined placement.
Figure 15B:
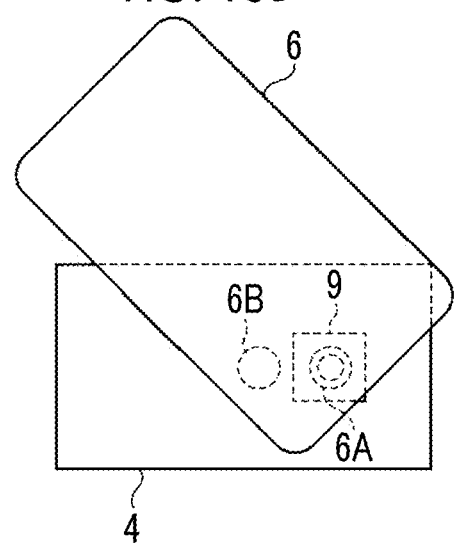
Figure 15C:
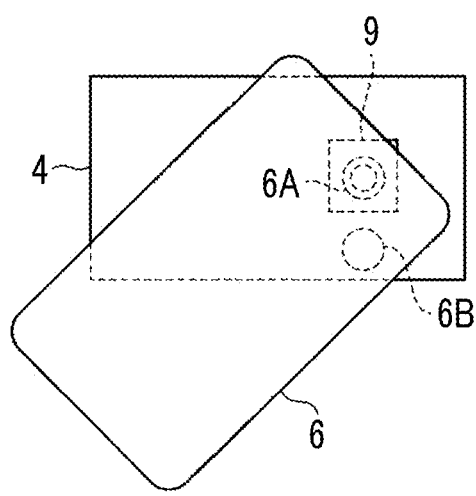

FIGS. 15A to 15C are diagrams illustrating an example of the light irradiation direction of a sixth smartphone 6 in which the camera 6A and the light source 6B are placed in an inclined manner.

As illustrated in FIG. 15A, in the smartphone 6 of FIGS. 15A to 15C, the light source 6B is placed in the diagonally lower right direction from the position of the camera 6A placed in the upper half of the smartphone 6, as viewed from the operation surface of the smartphone 6.

FIG. 15B is a diagram illustrating an example of the placement of the smartphone 6 in a case where the inspection image 9 to be irradiated from the left is captured by the smartphone 6 of FIG. 15A.

FIG. 15C is a diagram illustrating an example of the placement of the smartphone 6 in a case where the inspection image 9 to be irradiated from the lower is captured by the smartphone 6 of FIG. 15A.

Figure 16A:
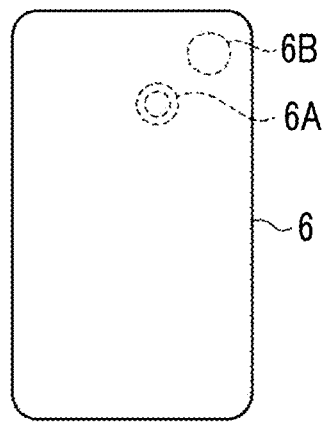
FIGS. 16A to 16C are diagrams illustrating an example of an image-capturing mode of a seventh smartphone of an inclined placement.
Figure 16B:
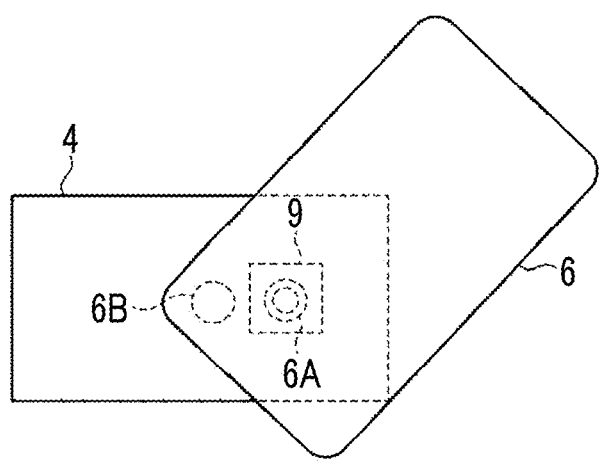
Figure 16C:
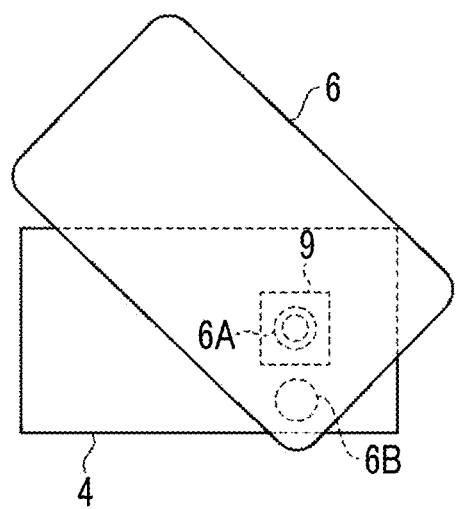

FIGS. 16A to 16C are diagrams illustrating an example of the light irradiation direction of a seventh smartphone 6 in which the camera 6A and the light source 6B are placed in an inclined manner.

As illustrated in FIG. 16A, in the smartphone 6 of FIGS. 16A to 16C, the light source 6B is placed in the diagonally upper right direction from the position of the camera 6A placed in the upper half of the smartphone 6, as viewed from the operation surface of the smartphone 6.

FIG. 16B is a diagram illustrating an example of the placement of the smartphone 6 in a case where the inspection image 9 to be irradiated from the left is captured by the smartphone 6 of FIG. 16A.

FIG. 16C is a diagram illustrating an example of the placement of the smartphone 6 in a case where the inspection image 9 to be irradiated from the lower is captured by the smartphone 6 of FIG. 16A.

Figure 17A:
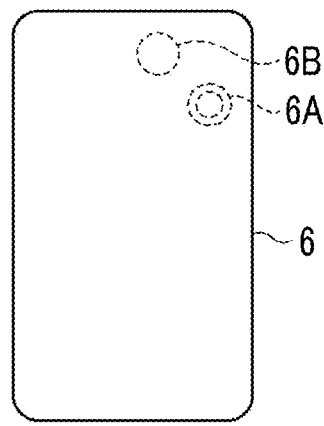
FIGS. 17A to 17C are diagrams illustrating an example of an image-capturing mode of an eighth smartphone of an inclined placement.
Figure 17B:
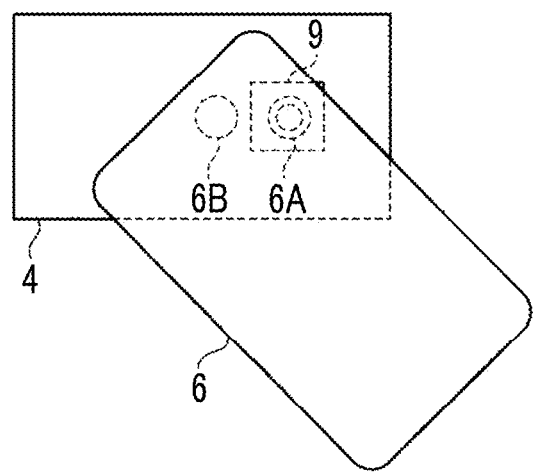
Figure 17C:
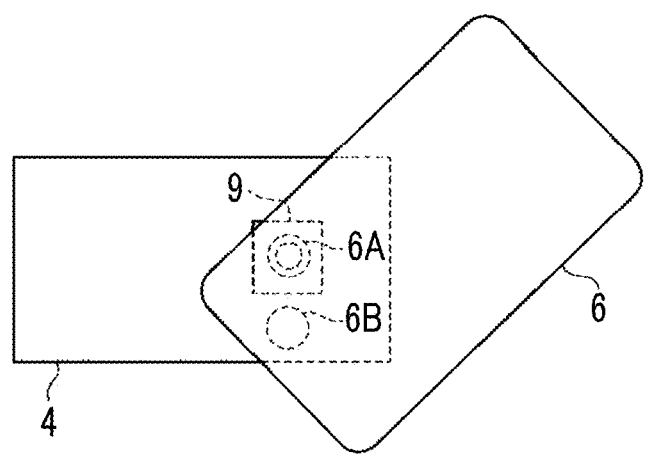

FIGS. 17A to 17C are diagrams illustrating an example of the light irradiation direction of an eighth smartphone 6 in which the camera 6A and the light source 6B are placed in an inclined manner.

As illustrated in FIG. 17A, in the smartphone 6 of FIGS. 17A to 17C, the light source 6B is placed in the diagonally upper left direction from the position of the camera 6A placed in the upper half of the smartphone 6, as viewed from the operation surface of the smartphone 6.

FIG. 17B is a diagram illustrating an example of the placement of the smartphone 6 in a case where the inspection image 9 to be irradiated from the left is captured by the smartphone 6 of FIG. 17A.

FIG. 17C is a diagram illustrating an example of the placement of the smartphone 6 in a case where the inspection image 9 to be irradiated from the lower is captured by the smartphone 6 of FIG. 17A.

In placing the smartphone 6 with respect to the inspection image 9 as illustrated in FIGS. 14 to 17, a captured image obtained by capturing the inspection image 9 to be irradiated from the left and a captured image obtained by capturing the inspection image 9 to be irradiated from the lower, even by the smartphone 6 in which the camera 6A and the light source 6B are placed in an inclined manner.

Here, the placement of the smartphone 6 has been described which captures the inspection image 9 according to the irradiation direction of the light, based on an example in which a registered image obtained by capturing the collation image 1 to be irradiated from the left and a registered image obtained by capturing the collation image 1 to be irradiated from the lower are prepared as a registered image group of the collation image 1. However, the registered images included in the registered image group of the collation image 1 are not limited to the registered image obtained by capturing the collation image 1 to be irradiated from the left and the registered image obtained by capturing the collation image 1 to be irradiated from the lower. For example, the registered images may be the registered image obtained by capturing the collation image 1 to be irradiated from the right and the registered image obtained by capturing the collation image 1 to be irradiated from the upper.

Then, the user may capture the inspection image 9 in each irradiation direction with the smartphone 6, while changing the placement of the smartphone 6 so as to match each irradiation direction of the light in a case where the collation image 1 is captured with the dedicated equipment 15.

That is, in a case where there are two registered images having different light irradiation directions as the registered image group of one collation image 1, the collation device 10 can collate the inspection image 9 and the collation image 1, based on the similarity between each collation image 1 included in two registered images and each inspection image 9 included in two captured images.

However, among the placements of the smartphones 6 illustrated in FIGS. 10A to 17C, in a case where the user holds the smartphone 6 in his hand and tries to capture an image in that placement, there is a placement that is difficult to realize due to the range of motion of the joints of the body, and a placement in which the smartphone 6 needs to be switched from one hand to the other hand. For example, as illustrated in FIGS. 11B, 13C, 15B, 16B, 16C, and 17C, in the placement that requires smartphone 6 to be held upside down, the operability of the smartphone 6 in a case of capturing the inspection image 9 is inferior to the operability in the other placements.

In order to deal with such a situation, as a registered image group of one collation image 1, four registered images having different light irradiation directions may be captured and registered in the registered image DB 13. Since the change in the pattern of the collation image 1 becomes larger as the irradiation direction of each light is different, in this case, an image is captured while shifting the irradiation direction of the light irradiating the collation image 1 by 90 degrees along the periphery of the collation image 1, for example, such as a registered image obtained by capturing the collation image 1 to be irradiated from the upper, a registered image obtained by capturing the collation image 1 to be irradiated from the right, a registered image obtained by capturing the collation image 1 to be irradiated from the lower, and a registered image obtained by capturing the collation image 1 to be irradiated from the left.

"To capture an image while shifting the irradiation direction of the light along the periphery of the collation image 1" means that, for example, in a case where the collation image 1 is viewed from the front, the collation image 1 is irradiated with light in a certain direction and captured with the dedicated equipment 15, while moving the light source 15B of the dedicated equipment 15 along the contour line of the collation image 1. In a case where the illuminance on the collation image 1 is greatly high, halation is likely to occur. Therefore, the collation image 1 may be captured in a positional relationship such that the optical axis of the light source 15B does not intersect the collation image 1.

In the case of the smartphone 6 illustrated in FIG. 11A, the registered image obtained by capturing the collation image 1 to be irradiated from the upper and the registered image obtained by capturing the collation image 1 to be irradiated from the right are also be included in the registered image group such that, for example, the user may not capture the inspection image 9 to be irradiated from the left as illustrated in FIG. 11B.

FIGS. 18A and 18B are diagrams illustrating an example of the placement of the smartphone 6 in a case where the inspection image 9 is captured by the smartphone 6 illustrated in FIG. 11A.

In FIGS. 18A and 18B, FIG. 18A is a diagram illustrating an example of the placement of the smartphone 6 in a case where the inspection image 9 to be irradiated from the upper is captured by the smartphone 6 of FIG. 11A.

FIG. 18B is a diagram illustrating an example of the placement of the smartphone 6 in a case where the inspection image 9 to be irradiated from the right is captured by the smartphone 6 of FIG. 11A.

In the case of the smartphone 6 illustrated in FIG. 13A, the registered image obtained by capturing the collation image 1 to be irradiated from the upper and the registered image obtained by capturing the collation image 1 to be irradiated from the right are also be included in the registered image group such that, for example, the user may not capture the inspection image 9 to be irradiated from the lower as illustrated in FIG. 13C.

Figure 19A:
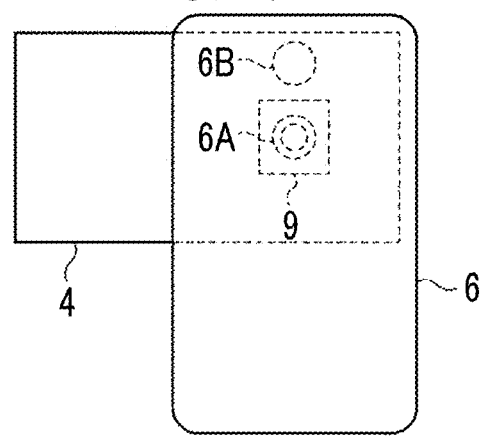
FIGS. 19A and 19B are diagrams illustrating an example of another image-capturing mode in the fourth smartphone.
Figure 19B:
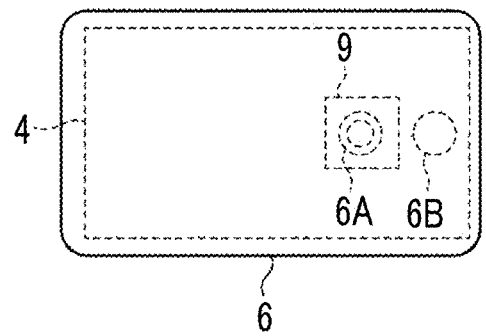

FIGS. 19A and 19B are diagrams illustrating an example of the placement of the smartphone 6 in a case where the inspection image 9 is captured by the smartphone 6 illustrated in FIG. 13A.

In FIGS. 19A and 19B, FIG. 19A is a diagram illustrating an example of the placement of the smartphone 6 in a case where the inspection image 9 to be irradiated from the upper is captured by the smartphone 6 of FIG. 13A.

FIG. 19B is a diagram illustrating an example of the placement of the smartphone 6 in a case where the inspection image 9 to be irradiated from the right is captured by the smartphone 6 of FIG. 13A.

In the case of the smartphone 6 illustrated in FIG. 15A, the registered image obtained by capturing the collation image 1 to be irradiated from the upper and the registered image obtained by capturing the collation image 1 to be irradiated from the right are also be included in the registered image group such that, for example, the user may not capture the inspection image 9 to be irradiated from the left as illustrated in FIG. 15B.

Figure 20A:
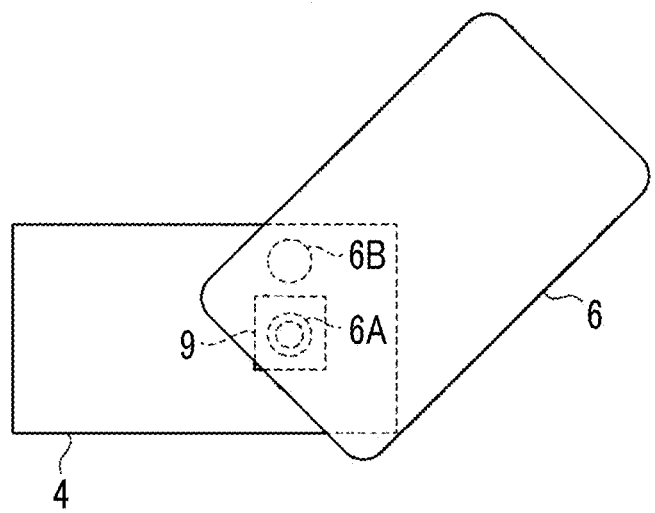
FIGS. 20A and 20B are diagrams illustrating an example of another image-capturing mode in the sixth smartphone.
Figure 20B:
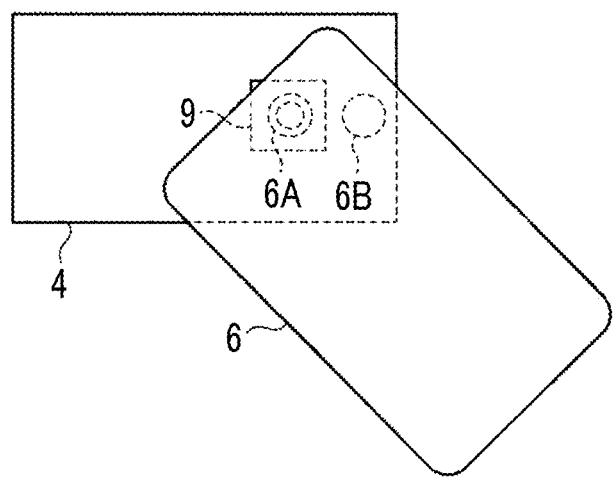

FIGS. 20A and 20B are diagrams illustrating an example of the placement of the smartphone 6 in a case where the inspection image 9 is captured by the smartphone 6 illustrated in FIG. 15A.

In FIGS. 20A and 20B, FIG. 20A is a diagram illustrating an example of the placement of the smartphone 6 in a case where the inspection image 9 to be irradiated from the upper is captured by the smartphone 6 of FIG. 11A.

FIG. 20B is a diagram illustrating an example of the placement of the smartphone 6 in a case where the inspection image 9 to be irradiated from the right is captured by the smartphone 6 of FIG. 15A.

In the case of the smartphone 6 illustrated in FIG. 16A, the registered image obtained by capturing the collation image 1 to be irradiated from the upper and the registered image obtained by capturing the collation image 1 to be irradiated from the right are also be included in the registered image group such that, for example, the user may not capture the inspection images 9 to be irradiated from the left and the lower as illustrated in FIGS. 16B and 16C.

Figure 21A:
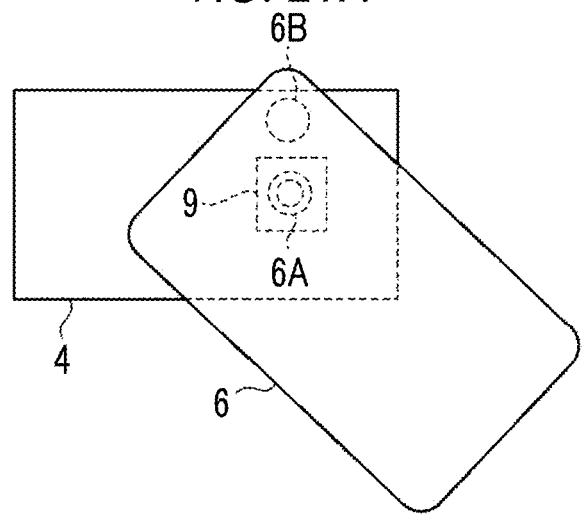
FIGS. 21A and 21B are diagrams illustrating an example of another image-capturing mode in the seventh smartphone.
Figure 21B:
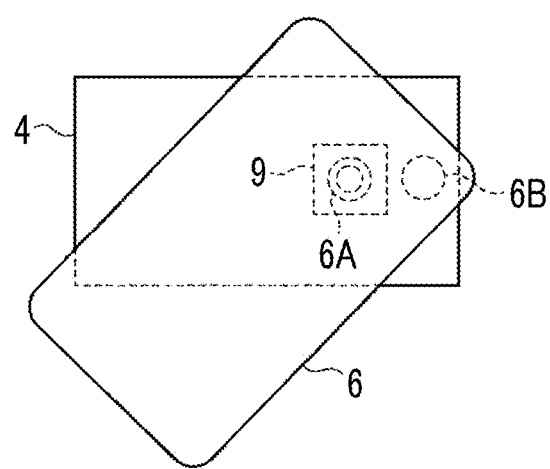

FIGS. 21A and 21B are diagrams illustrating an example of the placement of the smartphone 6 in a case where the inspection image 9 is captured by the smartphone 6 illustrated in FIG. 16A.

In FIGS. 21A and 21B, FIG. 21A is a diagram illustrating an example of the placement of the smartphone 6 in a case where the inspection image 9 to be irradiated from the upper is captured by the smartphone 6 of FIG. 16A.

FIG. 21B is a diagram illustrating an example of the placement of the smartphone 6 in a case where the inspection image 9 to be irradiated from the right is captured by the smartphone 6 of FIG. 16A.

In the case of the smartphone 6 illustrated in FIG. 17A, the registered image obtained by capturing the collation image 1 to be irradiated from the upper and the registered image obtained by capturing the collation image 1 to be irradiated from the right are also be included in the registered image group such that, for example, the user may not capture the inspection image 9 to be irradiated from the lower as illustrated in FIG. 17C.

Figure 22A:
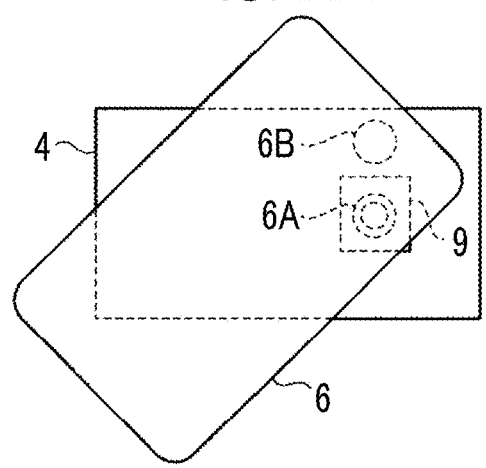
FIGS. 22A and 22B are diagrams illustrating an example of another image-capturing mode in the eighth smartphone.
Figure 22B:
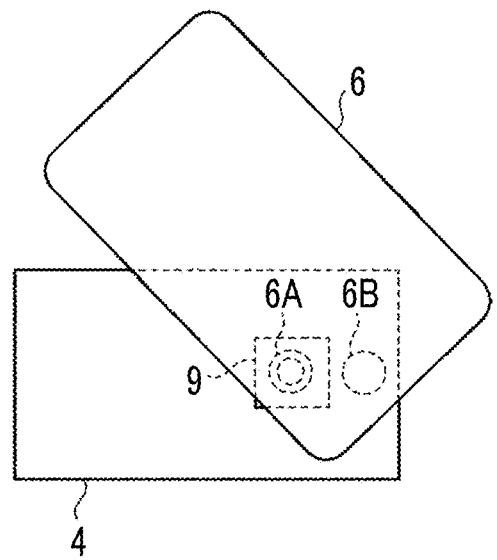

FIGS. 22A and 22B are diagrams illustrating an example of the placement of the smartphone 6 in a case where the inspection image 9 is captured by the smartphone 6 illustrated in FIG. 17A.

In FIGS. 22A and 22B, FIG. 22A is a diagram illustrating an example of the placement of the smartphone 6 in a case where the inspection image 9 to be irradiated from the upper is captured by the smartphone 6 of FIG. 17A.

FIG. 22B is a diagram illustrating an example of the placement of the smartphone 6 in a case where the inspection image 9 to be irradiated from the right is captured by the smartphone 6 of FIG. 17A.

Further, for example, in the case of the smartphone 6 illustrated in FIG. 11A, it is easier for the user to capture the inspection image 9 with the placement of the smartphone 6 illustrated in FIGS. 11C, 18A, and 18B, rather than to capture the inspection image 9 with the placement of the smartphone 6 illustrated in FIG. 11B. Therefore, in a case where the smartphone 6 illustrated in FIG. 11A is used, the user is more likely to capture the inspection image 9 in two any light irradiation directions, among the upper irradiation, the right irradiation, and the lower irradiation.

In this case, in a status where as the registered image group of each collation image 1, the registered image obtained by capturing the collation image 1 to be irradiated from the upper, the registered image obtained by capturing the collation image 1 to be irradiated from the right, the registered image obtained by capturing the collation image 1 to be irradiated from the lower, and the registered image obtained by capturing the collation image 1 to be irradiated from the left are registered in the registered image DB 13, even in a case where two captured images with different light irradiation directions, which are images captured in any of the upper, right, lower, and left irradiation directions, are transmitted to the collation device 10, the collation device 10 can collate the inspection image 9 with the collation image 1, after determining whether or not the inspection image 9 is a duplicate image 2 of the collation image 1.

That is, no matter how the camera 6A and the light source 6B are placed in the smartphone 6, a registered image group including at least four registered images having different light irradiation directions, for example, such as upper irradiation, right irradiation, lower irradiation, and left irradiation is registered for each collation image 1, in the registered image DB 13 of the collation device 10 such that the inspection image 9 included in the captured image captured by the smartphone 6 is to be collated with the collation image 1.

On the other hand, in a case where inspection images 9 to be irradiated from the upper, the right, the lower, and the left are captured with the smartphone 6 in which the camera 6A and the light source 6B are placed orthogonally, as illustrated in FIGS. 10A to 13C, 18A and 18B, and 19A and 19B, the user may place the smartphone 6 in the horizontal direction or the vertical direction and capture images. However, in a case where inspection images 9 to be irradiated from the upper, the right, the lower, and the left are captured with the smartphone 6 in which the camera 6A and the light source 6B are placed in an inclined manner, as illustrated in FIGS. 14A to 17C, and 20A and 22B, there arises a situation in which the user needs to place the smartphone 6 in the diagonal direction with respect to the inspection image 9 and capture images.

It is easier for the user to hold and operate the smartphone 6 such that the smartphone is placed in the horizontal or vertical direction than to hold the smartphone 6 such that the smartphone 6 is placed in the diagonal direction.

Therefore, for example, assuming that the user places the smartphone 6, in which the camera 6A and the light source 6B are placed in an inclined manner, in the horizontal direction or the vertical direction to capture the inspection image 9, as a registered image group, the registered images captured in the identical irradiation direction as the irradiation direction of the light of the light source 6B in the case where the smartphone 6 is placed in the horizontal direction or the vertical direction to capture the inspection image 9 are also registered in the registered image DB 13 for each collation image 1.

Note that placing the smartphone 6 in the horizontal direction means placing the smartphone such that the long side of the contour line of the smartphone 6 can be seen along the left-right direction in the user's field of view, and placing the smartphone 6 in the vertical direction means placing the smartphone such that the long side of the contour line of the smartphone 6 can be seen along the up-down direction in the user's field of view. Further, placing the smartphone 6 in the diagonal direction means placing the smartphone 6 such that an angle formed by the long side of the contour line of the smartphone 6 and the horizontal line that is virtually set along the left-right direction in the user's field of view is an angle other than 90 degrees.

Figure 23A:
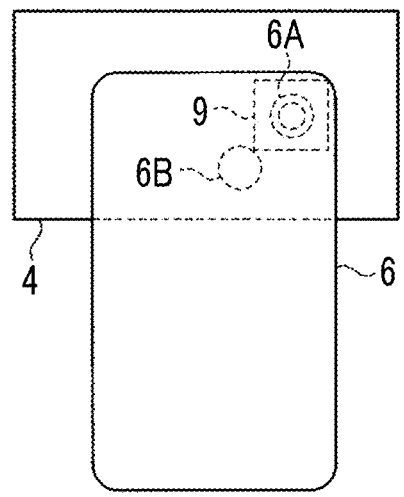
FIGS. 23A to 23C are diagrams illustrating an example of an image-capturing mode in which the fifth smartphone is placed in a horizontal direction or a vertical direction.
Figure 23B:
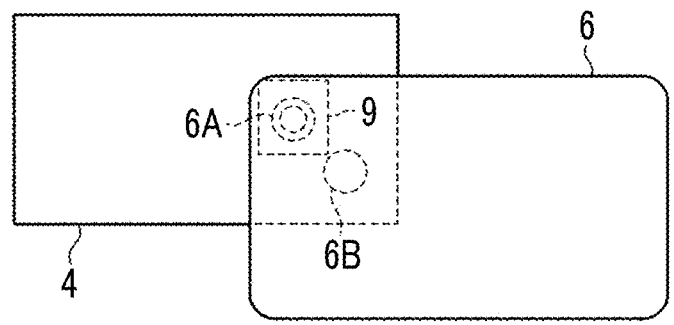
Figure 23C:
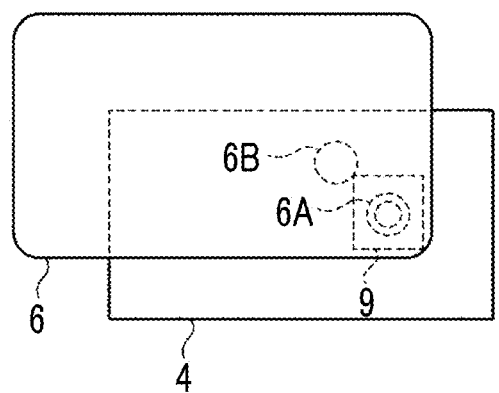

FIGS. 23A to 23C are diagrams illustrating a placement example in which the smartphone 6 of the inclined placement illustrated in FIGS. 14A to 14C is placed in the horizontal direction or the vertical direction.

FIG. 23A is a diagram illustrating a placement example in which the smartphone 6 is placed in the vertical direction such that the camera 6A is on the upper side. In this case, with respect to the irradiation direction of light to be emitted from the left, the light source 6B of the smartphone 6 irradiates (diagonally lower left irradiation) the inspection image 9 with light from a direction (referred to as "diagonally lower left direction") shifted from the light irradiation direction by 45 degrees counterclockwise along the periphery of the inspection image 9.

FIG. 23B is a diagram illustrating a placement example in which the smartphone 6 is placed in the horizontal direction such that the camera 6A is on the left side. In this case, with respect to the irradiation direction of light to be emitted from the lower, the light source 6B of the smartphone 6 irradiates (diagonally lower right irradiation) the inspection image 9 with light from a direction (referred to as "diagonally lower right direction") shifted from the light irradiation direction by 45 degrees counterclockwise along the periphery of the inspection image 9.

FIG. 23C is a diagram illustrating a placement example in which the smartphone 6 is placed in the horizontal direction such that the camera 6A is on the right side. In this case, with respect to the irradiation direction of light to be emitted from the upper, the light source 6B of the smartphone 6 irradiates (diagonally upper left irradiation) the inspection image 9 with light from a direction (referred to as "diagonally upper left direction") shifted from the light irradiation direction by 45 degrees counterclockwise along the periphery of the inspection image 9.

In a case where the smartphone 6 illustrated in FIGS. 23A to 23C is placed in the vertical direction such that the camera 6A is on the lower side, with respect to the irradiation direction of light to be emitted from the right, the light source 6B of the smartphone 6 irradiates (diagonally upper right irradiation) the inspection image 9 with light from a direction (referred to as "diagonally upper right direction") shifted from the light irradiation direction by 45 degrees counterclockwise along the periphery of the inspection image 9. However, in this case, since it is necessary to hold the smartphone 6 upside down, the operability of the smartphone 6 is inferior to the operability of the smartphone 6 in each placement illustrated in FIGS. 23A to 23C. Therefore, in the case of the smartphone 6 of the inclined placement as illustrated in FIGS. 23A to 23C, for example, the registered image obtained by capturing the collation images 1 to be irradiated from the diagonally lower left, the diagonally lower right, and the diagonally upper left may be registered as a registered image group, in the registered image DB 13 of the collation device 10, in addition to the four registered images obtained by capturing the collation images 1 to be irradiated from the upper, the right, the lower, and the left.

Figure 24A:
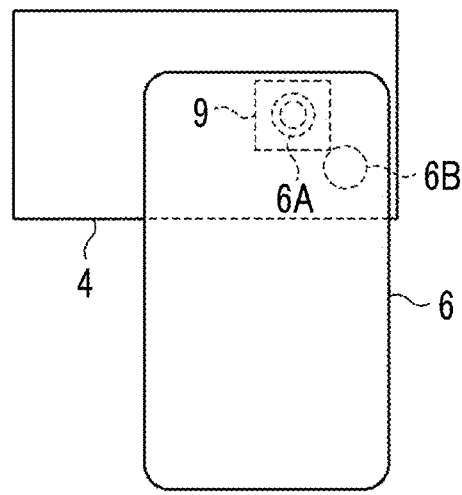
FIGS. 24A to 24C are diagrams illustrating an example of an image-capturing mode in which the sixth smartphone is placed in the horizontal direction or the vertical direction.
Figure 24B:
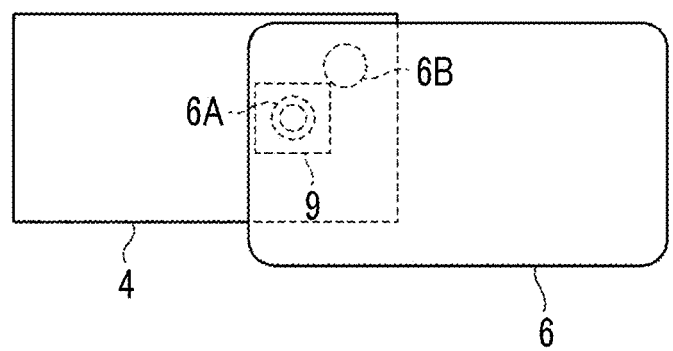
Figure 24C:
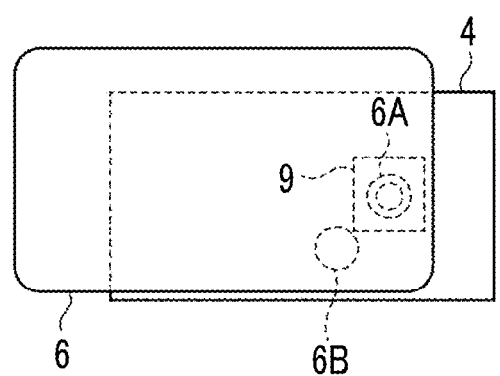

FIGS. 24A to 24C are diagrams illustrating a placement example in which the smartphone 6 of the inclined placement illustrated in FIGS. 15A to 15C is placed in the horizontal direction or the vertical direction.

FIG. 24A is a diagram illustrating a placement example in which the smartphone 6 is placed in the vertical direction such that the camera 6A is on the upper side. In this case, the light source 6B of the smartphone 6 irradiates the inspection image 9 with light from the diagonally lower right direction.

FIG. 24B is a diagram illustrating a placement example in which the smartphone 6 is placed in the horizontal direction such that the camera 6A is on the left side. In this case, the light source 6B of the smartphone 6 irradiates the inspection image 9 with light from the diagonally upper right direction.

FIG. 24C is a diagram illustrating a placement example in which the smartphone 6 is placed in the horizontal direction such that the camera 6A is on the right side. In this case, the light source 6B of the smartphone 6 irradiates the inspection image 9 with light from the diagonally lower left direction.

In a case where the smartphone 6 illustrated in FIGS. 24A to 24C is placed in the vertical direction such that the camera 6A is on the lower side, the light source 6B of the smartphone 6 irradiates the inspection image 9 with light from the diagonally upper left direction. However, in this case, since it is necessary to hold the smartphone 6 upside down, the operability of the smartphone 6 is inferior to the operability of the smartphone 6 in each placement illustrated in FIGS. 24A to 24C. Therefore, in the case of the smartphone 6 of the inclined placement as illustrated in FIGS. 24A to 24C, for example, the registered image obtained by capturing the collation images 1 to be irradiated from the diagonally lower right, the diagonally upper right, and the diagonally lower left may be registered as a registered image group, in the registered image DB 13 of the collation device 10, in addition to the four registered images obtained by capturing the collation images 1 to be irradiated from the upper, the right, the lower, and the left.

Figure 25A:
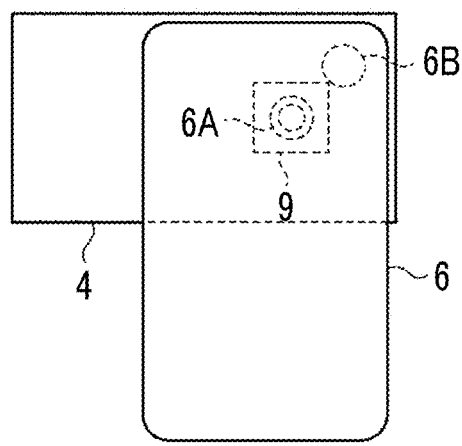
FIGS. 25A to 25C are diagrams illustrating an example of an image-capturing mode in which the seventh smartphone is placed in the horizontal direction or the vertical direction.
Figure 25B:
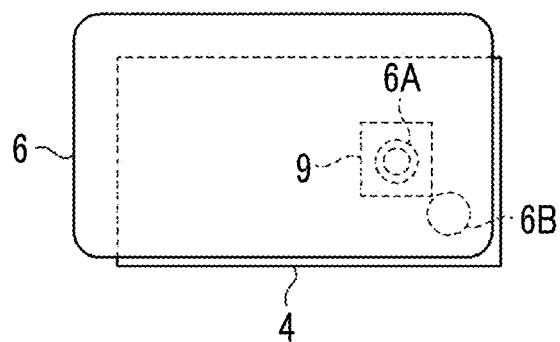
Figure 25C:
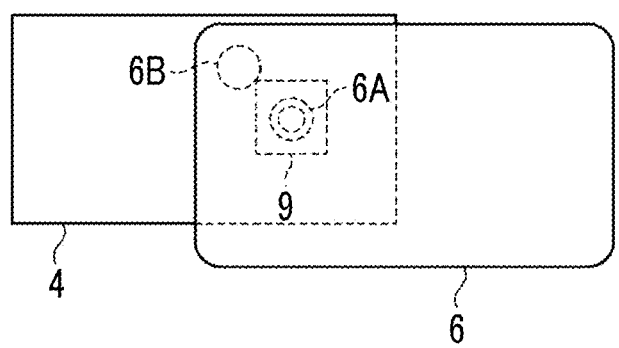

FIGS. 25A to 25C are diagrams illustrating a placement example in which the smartphone 6 of the inclined placement illustrated in FIGS. 16A to 16C is placed in the horizontal direction or the vertical direction.

FIG. 25A is a diagram illustrating a placement example in which the smartphone 6 is placed in the vertical direction such that the camera 6A is on the upper side. In this case, the light source 6B of the smartphone 6 irradiates the inspection image 9 with light from the diagonally upper right direction.

FIG. 25B is a diagram illustrating a placement example in which the smartphone 6 is placed in the horizontal direction such that the camera 6A is on the right side. In this case, the light source 6B of the smartphone 6 irradiates the inspection image 9 with light from the diagonally lower right direction.

FIG. 25C is a diagram illustrating a placement example in which the smartphone 6 is placed in the horizontal direction such that the camera 6A is on the left side. In this case, the light source 6B of the smartphone 6 irradiates the inspection image 9 with light from the diagonally upper left direction.

In a case where the smartphone 6 illustrated in FIGS. 25A to 25C is placed in the vertical direction such that the camera 6A is on the lower side, the light source 6B of the smartphone 6 irradiates the inspection image 9 with light from the diagonally lower left direction. However, in this case, since it is necessary to hold the smartphone 6 upside down, the operability of the smartphone 6 is inferior to the operability of the smartphone 6 in each placement illustrated in FIGS. 25A to 25C. Therefore, in the case of the smartphone 6 of an inclined placement as illustrated in FIGS. 25A to 25C, for example, the registered image obtained by capturing the collation images 1 to be irradiated from the diagonally upper right, the diagonally lower right, and the diagonally upper left may be registered as a registered image group, in the registered image DB 13 of the collation device 10, in addition to the four registered images obtained by capturing the collation images 1 to be irradiated from the upper, the right, the lower, and the left.

Figure 26A:
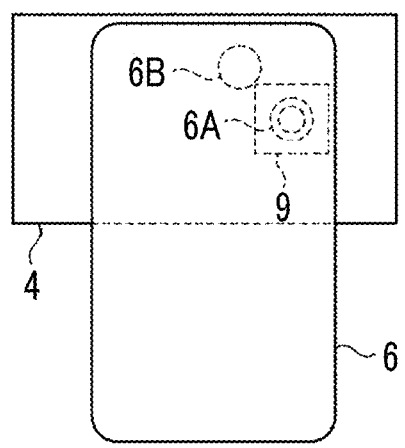
FIGS. 26A to 26C are diagrams illustrating an example of an image-capturing mode in which the eighth smartphone is placed in the horizontal direction or the vertical direction.
Figure 26B:
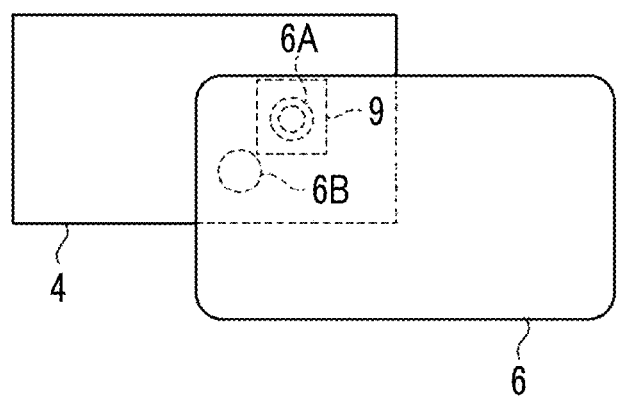
Figure 26C:
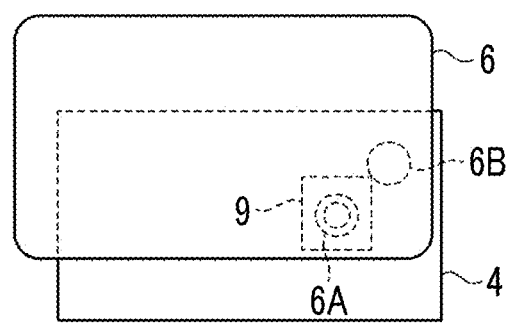

FIGS. 26A to 26C are diagrams illustrating aa placement example in which the smartphone 6 of the inclined placement illustrated in FIGS. 17A to 17C is placed in the horizontal direction or the vertical direction.

FIG. 26A is a diagram illustrating a placement example in which the smartphone 6 is placed in the vertical direction such that the camera 6A is on the upper side. In this case, the light source 6B of the smartphone 6 irradiates the inspection image 9 with light from the diagonally upper left direction.

FIG. 26B is a diagram illustrating a placement example in which the smartphone 6 is placed in the horizontal direction such that the camera 6A is on the left side. In this case, the light source 6B of the smartphone 6 irradiates the inspection image 9 with light from the diagonally lower left direction.

FIG. 26C is a diagram illustrating a placement example in which the smartphone 6 is placed in the horizontal direction such that the camera 6A is on the right side. In this case, the light source 6B of the smartphone 6 irradiates the inspection image 9 with light from the diagonally upper right direction.

In a case where the smartphone 6 illustrated in FIGS. 26A to 26C is placed in the vertical direction such that the camera 6A is on the lower side, the light source 6B of the smartphone 6 irradiates the inspection image 9 with light from the diagonally lower right direction. However, in this case, since it is necessary to hold the smartphone 6 upside down, the operability of the smartphone 6 is inferior to the operability of the smartphone 6 in each placement illustrated in FIGS. 26A to 26C. Therefore, in the case of the smartphone 6 of an inclined placement as illustrated in FIGS. 26A to 26C, for example, the registered image obtained by capturing the collation images 1 to be irradiated from the diagonally upper left, the diagonally lower left, and to be diagonally upper right may be registered as a registered image group, in the registered image DB 13 of the collation device 10, in addition to the four registered images obtained by capturing the collation images 1 to be irradiated from the upper, the right, the lower, and the left.

As a matter of course, considering that there is a user who captures the inspection image 9 by holding each smartphone 6 illustrated in FIGS. 23A to 26C upside down, a total of eight registered images including four registered images obtained by capturing the collation images 1 to be irradiated from the upper, the right, the lower, and the left and four registered images obtained by capturing the collation images 1 to be irradiated from the diagonally upper left, the diagonally lower left, the diagonally upper right, and the diagonally lower right may be registered for each collation image 1 as a registered image group, in the registered image DB 13 of the collation device 10.

Here, as an example, with respect to each irradiation direction of the light in a case where the collation images 1 to be irradiated from the upper, the right, the lower, and the left are captured, the image captured by irradiating the collation image 1 with light from a direction shifted from the light irradiation direction by 45 degrees counterclockwise along the periphery of the collation image 1 is used as a registered image, but the registered image may be captured by irradiating the collation image 1 with light from a direction shifted from the light irradiation direction within a range of less than 90 degrees such as 30 degrees or 70 degrees counterclockwise along the periphery of the collation image 1. Further, there is no limit to the number of registered images registered as a registered image group for each collation image 1.

With respect to the irradiation direction of light of which the upper irradiation, the right irradiation, the lower irradiation, and left irradiation are performed, the registered image captured by irradiating the collation image 1 with light from a direction obtained by shifting the irradiation direction of light counterclockwise along the periphery of the collation image 1 by less than 90 degrees is an example of an additional image. Therefore, four registered images obtained by capturing the collation image 1 of the diagonally upper left irradiation, the diagonally lower left irradiation, the diagonally upper right irradiation, and the diagonally lower right irradiation are also examples of the additional images.

The registered image group does not need to necessarily include the registered images obtained by capturing the collation images 1 to be irradiated from the upper, the right, the lower, and the left, but may include only the registered images obtained by capturing the collation image 1 to be irradiated from the diagonally upper left, the diagonally lower left, the diagonally upper right, and the diagonally lower right.

Figure 27:
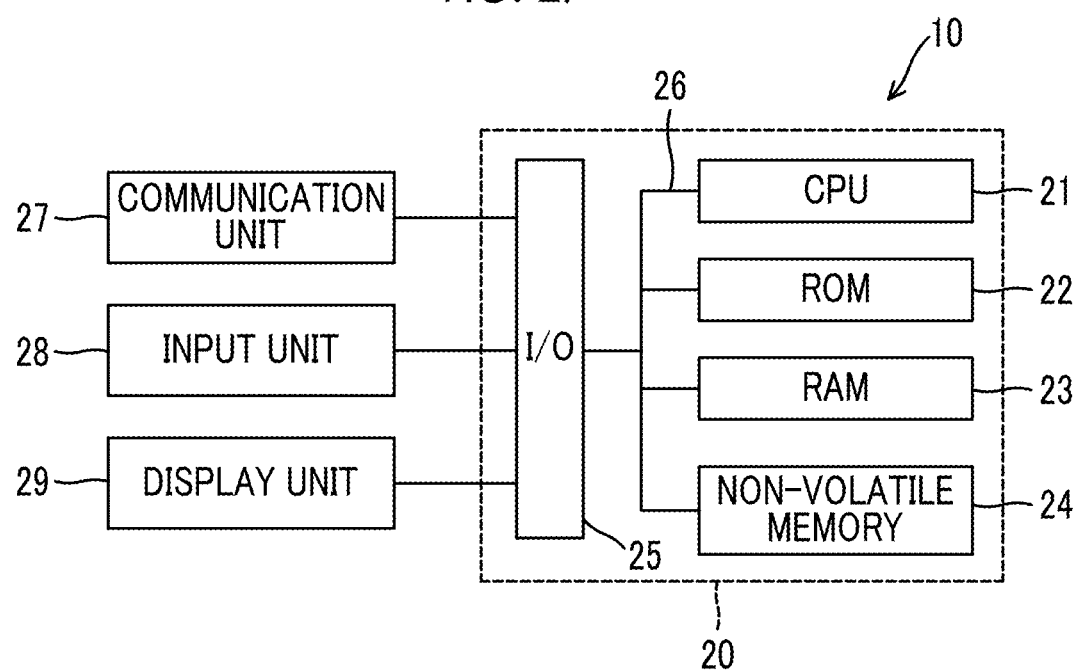
FIG. 27 is a diagram illustrating a configuration example of an electric system in a computer.

Such a collation device 10 can be configured by using a computer 20. FIG. 27 is a diagram illustrating a configuration example of an electric system in a computer 20.

The computer 20 includes a Central Processing Unit (CPU) 21 that is an example of a processor that is responsible for each functional unit of the collation device 10 illustrated in FIG. 7, a Read Only Memory (ROM) 22 that stores a collation program that causes the computer 20 to function as the collation device 10, a Random Access Memory (RAM) 23 used as a temporary work area of the CPU 21, a non-volatile memory 24, and an input/output interface (I/O) 25. The CPU 21, the ROM 22, the RAM 23, the non-volatile memory 24, and the I/O 25 are connected to each other via a bus 26.

The non-volatile memory 24 is an example of a storage device that retains stored information even in a case where power supplied to the non-volatile memory 24 is cut off. Therefore, the registered image DB 13 is constructed in, for example, the non-volatile memory 24.

A semiconductor memory is used for the non-volatile memory 24, but a hard disk may be used. Further, the non-volatile memory 24 does not necessarily need to be built in the computer 20, and may be, for example, a portable storage device that can be attached to and detached from the computer 20.

For example, a communication unit 27, an input unit 28, and a display unit 29 are connected to the I/O 25.

The communication unit 27 is connected to the communication line 8, and has a communication protocol for performing data communication with the smartphone 6.

The input unit 28 is a device that receives an instruction from the operator of the collation device 10 and notifies the CPU 21 of the instruction. For example, a button, a touch panel, a keyboard, a mouse, and the like are used.

The display unit 29 is an example of a device that visually displays information processed by the CPU 21, and for example, a liquid crystal display, an organic electro luminescence (EL) display, or the like is used.

Next, the collation process of the inspection image 9 and the collation image 1 in the collation device 10 will be described.

FIG. 28 is a flowchart illustrating an example of a collation process executed by the CPU 21 of the collation device 10, in a case where a plurality of captured images obtained by capturing the identical inspection image 9 while changing the light irradiation direction are received from the user's smartphone 6.

The collation program that defines the collation process is stored in advance in, for example, the ROM 22 of the collation device 10. The CPU 21 of the collation device 10 reads the collation program stored in the ROM 22 and executes the collation process.

Here, as an example, an example in which two captured images are received from the smartphone 6 will be described.

First, in step S10, the CPU 21 selects one of the captured images, calculates a similarity between the inspection image 9 included in the selected captured image and the collation image 1 included in the registered image registered in the registered image DB 13, by using a known collation algorithm, and determines whether or not there is a registered image including the collation image 1 similar to the inspection image 9.

The fact that the inspection image 9 and the collation image 1 are similar means that, for example, among a plurality of comparison areas preset for each image in order to compare the features of the two images, the number of comparison areas in which the features match is a reference value or more.

For convenience of explanation, the registered image including the collation image 1 similar to the inspection image 9 will be referred to as a "similar registered image" hereafter.

The absence of a similar registered image means that the inspection image 9 is not similar to the collation image 1 included in any of the registered images registered in the registered image DB 13. That is, the inspection image 9 is not the collation image 1. In this case, the process proceeds to step S50.

In step S50, the CPU 21 sets the collation result to "collation failure", transmits the collation result to the smartphone 6 via the communication unit 27, and ends the collation process illustrated in FIG. 28.

On the other hand, in a case where it is determined in the determination process of step S10 that there is a similar registered image similar to the inspection image 9, the process proceeds to step S20.

In this case, the inspection image 9 may be the collation image 1 included in the similar registered image, but it is also conceivable that the inspection image 9 is a duplicate image 2 of the collation image 1 included in the similar registered image. In a case where the inspection image 9 (referred to as "one inspection image 9") included in one captured image selected in step S10 is a genuine collation image 1, a similar registered image similar to the inspection image 9 (referred to as "the other inspection image 9") included in the other captured image is present in a registered image group including a similar registered image similar to the one inspection image 9.

Therefore, in step S20, the CPU 21 acquires a registered image group including similar registered images similar to one inspection image 9 from the registered image DB 13.

In step S30, the CPU 21 determines whether or not there is a registered image that is different from the similar registered image similar to the one inspection image 9, and is similar to the other inspection image 9, among the registered image group acquired in step S20. In a case where there is a similar registered image similar to the other inspection image 9, the process proceeds to step S40.

In this case, since the plurality of inspection images 9 captured while changing the irradiation direction of light are similar to the patterns of the identical collation image 1 in different light irradiation directions, the inspection image 9 included in the plurality of captured images is an image obtained by capturing a genuine collation image 1.

Therefore, in step S40, the CPU 21 sets the collation result to "collation success", transmits the collation result to the smartphone 6 via the communication unit 27, and ends the collation process illustrated in FIG. 28.

On the other hand, in a case where it is determined in the determination process of step S30 that there is no similar registered image similar to the other inspection image 9, the process proceeds to step S50.

In this case, since the inspection image 9 does not represent the identical pattern as the collation image 1 along the light irradiation direction, it is conceivable that the inspection image 9 captured by the smartphone 6 is a duplicate image 2 of the collation image 1. Therefore, the CPU 21 sets the collation result to "collation failure", transmits the collation result to the smartphone 6 via the communication unit 27, and ends the collation process illustrated in FIG. 28.

Here, an example has been described in which the collation device 10 acquires, from the smartphone 6, two captured images obtained by capturing the identical inspection image 9 while changing the irradiation direction of light, but the number of captured images that are used by the collation device 10 for collation with the collation image 1 is not limited to two, and may be three or more. In this case, it is conceivable that the registered image group may not necessarily include the registered image captured in the identical irradiation direction as the irradiation direction of the light emitted in a case where the user captures the inspection image 9 with the smartphone 6. Therefore, in a case where there is a specific registered image group including similar registered images that are respectively similar to the inspection images 9 included in at least two or more captured images, the collation device 10 may determine that the inspection image 9 captured by the smartphone 6 is a genuine collation image 1 corresponding to the specific registered image group.

Under the condition that there is a registered image group captured by emitting light from all directions along the periphery of the collation image 1, for each collation image 1, in a case where a specific registered image group includes a similar registered image that is similar to an inspection image 9 included in all captured images, the collation device 10 may determine that the inspection image 9 captured by the smartphone 6 is a genuine collation image 1 corresponding to the specific registered image group.

Up to this point, a description has been made based on the configuration of the image surface in which the collation image 1 is formed of the black powder, but as described above, the collation image 1 may be formed of the silver powder, and the collation image 1 may be formed by mixing black and silver powders. Black and silver powders tend to have a higher contrast between the color of the powder and the reflected light than powders of other colors. As the contrast between the color of the powder and the reflected light increases, the difference in the pattern appearing in the collation image 1 can be clearly recognized depending on the irradiation direction of the light. Therefore, the collation image 1 is formed by using, for example, at least one of black and silver powders.

In addition, black means a color having RGB values=(0, 0, 0) (referred to as "reference color" of black), and a color whose deviation from the reference color of black is within a permissible range for any of the values R, G, and B. The permissible range means the maximum amount of deviation from the reference color that is considered to be the identical color as the reference color, even in a case where the RGB value deviates from the reference color. Therefore, silver is a color having RGB values=(192, 192, 192), which is a reference color of silver, and a color whose deviation from the reference color of silver is within a permissible range for any of the values R, G, and B.

In the above, it has been described that the collation image 1 may be a silver powder, but the collation image 1 may be formed by attaching a material made by mixing silver powder to the surface of an object. Depending on the mixing ratio of the silver powder, the color of the collation image 1 may not always be the silver defined by the RGB values, but the difference in the pattern appearing in the collation image 1 can be recognized depending on the light irradiation direction.

Although an example in which the collation device 10 collates the inspection image 9 captured by the smartphone 6 and the collation image 1 has been described, the collation program to be executed by the collation device 10 may be executed by the smartphone 6, and the inspection image 9 and the collation image 1 may be collated by the smartphone 6.

Although one aspect of the collation device 10 has been described above using the exemplary embodiments, the form of the disclosed collation device 10 is an example, and the form of the collation device 10 is not limited to the range described in the exemplary embodiment. Various modifications and improvements can be added to the exemplary embodiments without departing from the scope of the present disclosure, and the exemplary embodiments to which the modifications or improvements are added are also included in the technical scope of the present disclosure. For example, the order of the collation process illustrated in FIG. 28 may be changed without departing from the spirit of the present disclosure.

Further, in the above-described exemplary embodiment, a mode in which the collation process is achieved by software has been described as an example. However, the identical process as the flowchart illustrated in FIG. 28 may be processed by hardware. In this case, the processing speed is increased as compared with the case where the collation process is implemented by software.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiment, an example in which the collation program is stored in the ROM 22 has been described, but the storage destination of the collation program is not limited to the ROM 22. The collation program of the present disclosure can also be provided in a form recorded on a storage medium readable by the computer 20. For example, the collation program may be provided in a form recorded on an optical disk such as a Compact Disk Read Only Memory (CD-ROM) and a Digital Versatile Disk Read Only Memory (DVD-ROM). Further, the collation program may be provided in a form recorded in a portable semiconductor memory such as a Universal Serial Bus (USB) memory and a memory card. The ROM 22, the non-volatile memory 24, the CD-ROM, the DVD-ROM, the USB, and the memory card are examples of non-transitory storage media.

Further, the collation device 10 may download a collation program from an external device (not illustrated) connected to the communication line 8 through the communication unit 27, and store the downloaded collation program in the storage device. In this case, the CPU 21 of the collation device 10 reads a collation program downloaded from an external device (not illustrated) from the storage device and executes the collation process.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A collation device comprising:
   a processor configured to:
   acquire a plurality of captured images obtained by capturing an inspection image to be collated, while changing an irradiation direction of light to be emitted; and
   provide a notification of a collation result between the inspection image included in each of the captured images, and a collation image of which pattern changes depending on the irradiation direction of the light, according to a similarity between a plurality of registered images obtained by capturing in advance the collation image while changing the irradiation direction of the light to be emitted to the collation image, and the inspection image, after adjusting a positional relationship between a camera, a light source, and an image to be identical to a positional relationship between a camera that captures the inspection image at a time of capturing the inspection image, a light source that irradiates the inspection image with light, and the inspection image.

2. The collation device according to claim 1, wherein the processor is configured to:
provide the notification of the collation result, by using the registered images including four images captured by shifting the irradiation direction of the light irradiating the collation image by 90 degrees along a periphery of the collation image.

3. The collation device according to claim 2, wherein the processor is configured to:
provide a notification of the collation result, by using the registered images including in addition to the four images, four additional images captured by shifting the irradiation direction of the light by less than 90 degrees along the periphery of the collation image, with respect to an irradiation direction of each light irradiating the collation image in a case of capturing the four images.

4. The collation device according to claim 3, wherein the processor is configured to:
add as the four additional images, images captured by shifting the irradiation direction of the light by 45 degrees along the periphery of the collation image, with respect to an irradiation direction of each light irradiating the collation image in a case of capturing the four images, to the registered images.

5. The collation device according to claim 1, wherein the processor is configured to:
provide a notification of a collation result between the inspection image and the collation image, by using the registered images captured by the light emitted from one point light source.

6. The collation device according to claim 2, wherein the processor is configured to:
provide a notification of a collation result between the inspection image and the collation image, by using the registered images captured by the light emitted from one point light source.

7. The collation device according to claim 3, wherein the processor is configured to:
provide a notification of a collation result between the inspection image and the collation image, by using the registered images captured by the light emitted from one point light source.

8. The collation device according to claim 4, wherein the processor is configured to:
provide a notification of a collation result between the inspection image and the collation image, by using the registered images captured by the light emitted from one point light source.

9. The collation device according to claim 5, wherein the processor is configured to:
provide a notification of a collation result between the inspection image and the collation image, by using the registered images in which an angle between an optical axis of the point light source and an optical axis of a camera in a first image-capturing device that captures the registered images is adjusted according to an angle between an optical axis of a camera in a second image-capturing device that captures the inspection image and an optical axis of a built-in point light source built in the second image-capturing device.

10. The collation device according to claim 6, wherein the processor is configured to:
provide a notification of a collation result between the inspection image and the collation image, by using the registered images in which an angle between an optical axis of the point light source and an optical axis of a camera in a first image-capturing device that captures the registered images is adjusted according to an angle between an optical axis of a camera in a second image-capturing device that captures the inspection image and an optical axis of a built-in point light source built in the second image-capturing device.

11. The collation device according to claim 7, wherein the processor is configured to:
provide a notification of a collation result between the inspection image and the collation image, by using the registered images in which an angle between an optical axis of the point light source and an optical axis of a camera in a first image-capturing device that captures the registered images is adjusted according to an angle between an optical axis of a camera in a second image-capturing device that captures the inspection image and an optical axis of a built-in point light source built in the second image-capturing device.

12. The collation device according to claim 8, wherein the processor is configured to:
provide a notification of a collation result between the inspection image and the collation image, by using the registered images in which an angle between an optical axis of the point light source and an optical axis of a camera in a first image-capturing device that captures the registered images is adjusted according to an angle between an optical axis of a camera in a second image-capturing device that captures the inspection image and an optical axis of a built-in point light source built in the second image-capturing device.

13. The collation device according to claim 1,
wherein the collation image is a three-dimensional image formed three-dimensionally on a recording medium.

14. The collation device according to claim 2,
wherein the collation image is a three-dimensional image formed three-dimensionally on a recording medium.

15. The collation device according to claim 3,
wherein the collation image is a three-dimensional image formed three-dimensionally on a recording medium.

16. The collation device according to claim 4,
wherein the collation image is a three-dimensional image formed three-dimensionally on a recording medium.

17. The collation device according to claim 5,
wherein the collation image is a three-dimensional image formed three-dimensionally on a recording medium.

18. The collation device according to claim 13,
wherein the three-dimensional image is an image formed by fixing powder on the recording medium.

19. The collation device according to claim 18,
wherein the image formed by the powder is an image composed of black or silver powder on a surface of the recording medium.

20. The collation device according to claim 1,
wherein the collation image is an image of a surface of an object to which a material composed of a mixture of silver powder is attached.

* * * * *